(12) United States Patent
Liang et al.

(10) Patent No.: US 10,491,254 B2
(45) Date of Patent: Nov. 26, 2019

(54) WIRELESS DEVICE AND WIRELESS LOCAL AREA NETWORK SIGNAL RECEIVING METHOD

(71) Applicant: Huawei Technologies Co., Ltd., Shenzhen (CN)

(72) Inventors: Dong Liang, Shenzhen (CN); Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/206,634

(22) Filed: Nov. 30, 2018

(65) Prior Publication Data

US 2019/0165823 A1 May 30, 2019

(30) Foreign Application Priority Data

Nov. 30, 2017 (CN) .......................... 2017 1 1238112

(51) Int. Cl.
*H04B 1/12* (2006.01)
*H04W 84/12* (2009.01)
(52) U.S. Cl.
CPC ............... *H04B 1/12* (2013.01); *H04W 84/12* (2013.01)
(58) Field of Classification Search
None
See application file for complete search history.

(56) References Cited

U.S. PATENT DOCUMENTS

| | | | | | |
|---|---|---|---|---|---|
| 4,972,503 | A | * | 11/1990 | Zurlinden | H04H 60/33 725/14 |
| 5,173,701 | A | * | 12/1992 | Dijkstra | G01S 7/36 342/17 |
| 5,696,559 | A | * | 12/1997 | Kim | H04N 5/16 348/691 |
| 6,393,254 | B1 | * | 5/2002 | Pousada Carballo | H04K 3/42 455/1 |

(Continued)

FOREIGN PATENT DOCUMENTS

DE 102009006861 A1 8/2010

OTHER PUBLICATIONS

Foreign Communication From a Counterpart Application, German Application No. DE102009006861, dated Aug. 12, 2010, 5 pages.

(Continued)

*Primary Examiner* — Lana N Le
(74) *Attorney, Agent, or Firm* — Conley Rose, P.C.

(57) ABSTRACT

A wireless device and a wireless local area network (WLAN) signal receiving method, where the wireless device includes a receiver, a jamming circuit, an interference cancelling circuit, a first antenna, and a second antenna. The receiver is coupled to the first antenna and configured to detect a WLAN signal, the jamming circuit is coupled to the second antenna, an input end of the interference cancelling circuit is coupled to the second antenna, and an output end of the interference cancelling circuit is coupled to the first antenna. The jamming circuit is configured to send, using the second antenna, an interference signal on a channel on which the WLAN signal is located, and the interference cancelling circuit is configured to generate, based on the interference signal, a reconstruction signal cancelling the interference signal received by the first antenna, and provide the reconstruction signal at the output end.

20 Claims, 19 Drawing Sheets

(56) References Cited

U.S. PATENT DOCUMENTS

| | | | | |
|---|---|---|---|---|
| 6,807,405 B1* | 10/2004 | Jagger | ............... | H04B 1/1036 |
| | | | | 455/296 |
| 9,608,678 B1* | 3/2017 | Sun | ............... | H04B 1/10 |
| 9,814,053 B2* | 11/2017 | Wang | ............... | H03F 1/0277 |
| 2007/0153714 A1 | 7/2007 | Shapira et al. | | |
| 2008/0012764 A1* | 1/2008 | Kang | ............... | H04B 7/0634 |
| | | | | 342/367 |
| 2012/0252349 A1 | 10/2012 | Kolinko et al. | | |
| 2015/0065058 A1* | 3/2015 | Wang | ............... | H04B 15/00 |
| | | | | 455/63.1 |
| 2015/0139122 A1* | 5/2015 | Rimini | ............... | H04B 1/123 |
| | | | | 370/329 |
| 2017/0048838 A1* | 2/2017 | Chrisikos | ............... | H04W 72/0406 |
| 2018/0294827 A1* | 10/2018 | Abdelmonem | ............... | H04B 1/1036 |

OTHER PUBLICATIONS

Foreign Communication From a Counterpart Application, European Application No. 18209596.8, Extended European Search Report dated Apr. 30, 2019, 5 pages.

* cited by examiner

WIRELESS DEVICE AND WIRELESS LOCAL AREA NETWORK SIGNAL RECEIVING METHOD

CROSS-REFERENCE TO RELATED APPLICATION

This application claims priority to Chinese Patent Application No. 201711238112.0 filed on Nov. 30, 2017, which is hereby incorporated by reference in its entirety.

TECHNICAL FIELD

This disclosure relates to the field of communications technologies, and in particular, to a wireless device and a wireless local area network (also referred to as WLAN) signal receiving method.

BACKGROUND

A wireless communications technology may allow terminals such as a personal computer and a mobile phone to be connected in a wireless manner, facilitating people's life to a greatest extent, and the wireless communications technology has been currently widely applied.

A WLAN is usually used in a short-distance coverage scenario. The WLAN includes a wireless access point (also referred to as AP) and a station (STA). When a STA sends a signal, another STA may listen to the signal. If the STA that listens to the signal determines that a channel is busy, the STA keeps silent. An AP may properly receive the signal sent by the STA.

However, if a distance between STAs is relatively long or obstruction exists between the STAs, a STA cannot listen to a signal sent by another STA. In this case, two or more STAs may simultaneously send signals. Signals simultaneously received by the AP from a plurality of STAs interfere with each other, affecting proper signal reception of the AP.

SUMMARY

This disclosure provides a wireless device and a WLAN signal receiving method, to resolve the foregoing problem. The technical solutions are as follows.

According to a first aspect, a wireless device is provided, where the wireless device includes a receiver, a jammer, an interference canceller, a first antenna, and a second antenna, the receiver is connected to the first antenna, the jammer is connected to the second antenna, an input end of the interference canceller is connected to the second antenna, and an output end of the interference canceller is connected to the first antenna, the receiver is configured to detect a WLAN signal, the jammer is configured to, in response to that the receiver detects the WLAN signal, send, using the second antenna, an interference signal on a channel on which the WLAN signal is located, and the interference canceller is configured to generate, based on the interference signal from the input end, a reconstruction signal used to cancel the interference signal received by the first antenna, and provide the reconstruction signal at the output end.

When detecting a WLAN signal from a STA, the wireless device provided in this disclosure sends an interference signal on a channel on which the WLAN signal is located. The wireless device generates, based on the interference signal, a reconstruction signal used to cancel the interference signal received by the first antenna, and provides the reconstruction signal at the output end. In this way, the wireless device is not affected by the interference signal sent by the wireless device. The STA sending the WLAN signal does not receive any signal at the same time, and therefore can properly send the WLAN signal. When listening to the interference signal on the channel, a STA other than the STA sending the WLAN signal determines that the channel is in a busy state, and keeps silent. This avoids a WLAN signal conflict. Sending the interference signal at the time of receiving the WLAN signal occupies no additional air interface resource, and a decrease in an overall throughput of a communications system is avoided.

In a first possible implementation of the first aspect, the receiver is configured to, when synchronization detection performed on a synchronization field in the received WLAN signal is completed, determine that the WLAN signal is detected, where the synchronization field includes any one or more of the following a legacy signal field, a high throughput signal field, a very high throughput signal field, a legacy short training field, a high throughput short training field, a very high throughput short training field, a legacy long training field, a high throughput long training field, or a very high throughput long training field, check a cyclic redundancy check (also referred to as CRC) code in a received wireless signal, and when the CRC check succeeds, determine that the WLAN signal is detected, or attempt to demodulate a preamble in a received wireless signal, and when demodulating the preamble is completed, determine that the WLAN signal is detected.

A type of the interference signal includes a first type: a local oscillator signal or a monophonic signal whose frequency is within band of the WLAN signal of a STA, a second type: an intra-frequency narrowband signal that is an intra-frequency signal whose bandwidth is less than the bandwidth of the WLAN signal of the STA, a third type: an intra-frequency same-band signal that is an intra-frequency signal whose bandwidth is equal to the bandwidth of the WLAN signal of the STA, and a fourth type: an intra-frequency broadband signal that is an intra-frequency signal whose bandwidth is greater than the bandwidth of the WLAN signal of the STA.

This disclosure further provides a plurality of manners for determining whether the WLAN signal is detected and a plurality of interference signal types. Any determining manner may be used to determine whether the WLAN signal is detected to determine an occasion of sending an interference signal, and any type of interference signal may be used to improve flexibility and diversity.

In a second possible implementation of the first aspect, the interference canceller is further configured to couple the interference signal from the input end, and adjust, based on a configuration, an interference signal obtained through coupling to obtain the reconstruction signal.

When sending the interference signal, the wireless device provided in this disclosure couples the interference signal and may adjust the interference signal obtained through coupling to obtain the reconstruction signal. The interference signal received by the first antenna may be canceled using the reconstruction signal. In this way, interference in the receiver can be canceled in a process of sending the interference signal, and it is ensured that the receiver can properly receive the WLAN signal.

In a third possible implementation of the first aspect, the interference canceller includes a phase shifter and an attenuator, the phase shifter is configured to adjust a phase of the interference signal, and the attenuator is configured to attenuate the interference signal.

In a fourth possible implementation of the first aspect, the receiver is further configured to, when detecting that a time point of stopping sending the interference signal is currently reached, send a stop indication to the jammer, and the jammer is further configured to, in response to the stop indication, stop sending the interference signal.

The time point of stopping sending the interference signal may be a moment when receiving the WLAN signal is completed, or the WLAN signal includes a field indicating an end time of the WLAN signal, and the time point of stopping sending the interference signal is the end time of the WLAN signal.

In a fifth possible implementation of the first aspect, the WLAN signal includes a field indicating an end time of the WLAN signal, the receiver is further configured to send, to the jammer, an end indication indicating the end time of the WLAN signal, and the jammer is further configured to stop sending the interference signal according to the end indication when the WLAN signal is ended or before the WLAN signal is ended.

The wireless device provided in this disclosure detects whether the time point of stopping sending the interference signal is currently reached. The time point of stopping sending the interference signal may be an end time point of the interference signal or a time point before the end time point. In this way, sending the interference signal can be stopped in time, to avoid a WLAN signal conflict caused when sending the interference signal is stopped too early, and also avoid a waste of channel resources caused when sending the interference signal is stopped too late.

In a sixth possible implementation of the first aspect, the receiver is further configured to enable a self-interference cancellation training mode, the jammer is further configured to, in response to that the receiver enables the self-interference cancellation training mode, generate the interference signal, and send the interference signal using the second antenna, the interference canceller is further configured to couple the interference signal from the input end, separately adjust, based on at least one group of configurations, an interference signal obtained through coupling, to obtain a training reconstruction signal, and provide the training reconstruction signal at the output end, the interference canceller is further configured to detect a training cancellation effect that is at the output end and between the training reconstruction signal and the interference signal received by the first antenna, when a training cancellation effect that meets a cancellation condition is obtained, determine a configuration corresponding to the training cancellation effect that meets the cancellation condition as a preferred configuration, and send the preferred configuration to the receiver, and the receiver is further configured to receive the preferred configuration, and disable the self-interference cancellation training mode.

The wireless device provided in this disclosure performs training on at least one group of configurations in the self-interference cancellation training mode, completes the training until a cancellation effect meets the cancellation condition, and adjusts, based on a trained configuration, the interference signal obtained through coupling. This can ensure that the cancellation effect meets the cancellation condition, and avoid affecting proper WLAN signal reception by the receiver due to a relatively poor cancellation effect.

In a seventh possible implementation of the first aspect, the receiver is further configured to start the jammer and the interference canceller after the self-interference cancellation training mode is disabled, the jammer is configured to generate the interference signal, and send the interference signal using the second antenna, the interference canceller is further configured to couple the interference signal from the input end, adjust, based on the preferred configuration, the interference signal obtained through coupling to obtain a reconstruction signal, provide the reconstruction signal at the output end, and detect a training cancellation effect that is at the output end and between the reconstruction signal and the interference signal received by the first antenna, the interference canceller is further configured to send a disabling notification message to the receiver when the cancellation effect meets the cancellation condition, or send a training notification message to the receiver when the cancellation effect does not meet the cancellation condition, where the disabling notification message is used to instruct to disable the jammer and the interference canceller, and the training notification message is used to instruct to enable the self-interference cancellation training mode, and the receiver is further configured to disable the jammer and the interference canceller when the disabling notification message is received, or enable the self-interference cancellation training mode when the training notification message is received.

The wireless device provided in this disclosure may further monitor a current cancellation effect after the training is completed, enable the self-interference cancellation training mode if the cancellation effect does not meet the cancellation condition, perform retraining on a configuration, and update the configuration. This can improve the cancellation effect, and prevent the cancellation effect from being reduced due to an external environment change or another reason.

In an eighth possible implementation of the first aspect, the receiver is further configured to send a clear to send-to-self (also referred to as CTS-to-self) frame when the self-interference cancellation training mode is enabled, and the CTS-to-self is used to instruct a STA associated with the wireless device to stop sending a WLAN signal in a reserved time period.

The wireless device provided in this disclosure can send the WLAN signal in a training procedure in combination with a request to send (RTS)-CTS mechanism, and send the CTS-to-self when the self-interference cancellation training mode is enabled. This ensures that all STAs associated with the wireless device stop sending WLAN signals in the reserved time period, and can exclude interference of in the WLAN signal, thereby improving accuracy of the training procedure, and further improving a cancellation effect.

In a ninth possible implementation of the first aspect, the wireless device includes a communications chip, the receiver and the jammer are located inside the communications chip, and the interference canceller is located outside the communications chip.

In a tenth possible implementation of the first aspect, the wireless device further includes a front end module, and the front end module is located outside the communications chip, and the communications chip is connected to the interference canceller using the front end module, and the interference canceller is connected to the first antenna, or the communications chip is connected to the front end module using the interference canceller, and the front end module is connected to the first antenna.

In an eleventh possible implementation of the first aspect, the wireless device includes a communications chip, the receiver is located inside the communications chip, and the jammer and the interference canceller are located outside the communications chip.

In a twelfth possible implementation of the first aspect, the jammer includes a phase-locked loop and a power amplifier, and the communications chip is connected to the phase-locked loop, the phase-locked loop is connected to the power amplifier, and the power amplifier is connected to the second antenna.

In a thirteenth possible implementation of the first aspect, a switch is disposed on an output pin of the communications chip, the switch is configured to control the output pin to connect to a first end of the switch or a second end of the switch, the first end is connected to the first antenna, the second end is connected to an input end of the jammer, and an output end of the jammer is connected to the second antenna.

This disclosure further provides a plurality of implementations of the wireless device. A structure is simple, and an implementation difficulty can be reduced.

According to a second aspect, a WLAN signal receiving method is provided, where the method includes detecting, by a receiver, a WLAN signal using a first antenna, in response to that the WLAN signal is detected, sending, by a jammer using a second antenna, an interference signal on a channel on which the WLAN signal is located, and generating, by an interference canceller based on the interference signal, a reconstruction signal used to cancel the interference signal received by the first antenna, and providing the reconstruction signal for the receiver.

In a first possible implementation of the second aspect, the detecting, by a receiver, a WLAN signal using a first antenna includes, when synchronization detection performed on a synchronization field in a received wireless signal is completed, determining that the WLAN signal is detected, where the synchronization field includes any one or more of a legacy signal field, a high throughput signal field, a very high throughput signal field, a legacy short training field, a high throughput short training field, a very high throughput short training field, a legacy long training field, a high throughput long training field, or a very high throughput long training field, checking a CRC code in a received wireless signal, and when the CRC check succeeds, determining that the WLAN signal is detected, or attempting to demodulate a preamble in a received wireless signal, and when demodulating the preamble is completed, determining that the WLAN signal is detected.

A type of the interference signal includes a first type: a local oscillator signal or a monophonic signal whose frequency is within band of the WLAN signal of a STA, a second type: an intra-frequency narrowband signal that is an intra-frequency signal whose bandwidth is less than the bandwidth of the WLAN signal of the STA, a third type: an intra-frequency same-band signal that is an intra-frequency signal whose bandwidth is equal to the bandwidth of the WLAN signal of the STA, and a fourth type: an intra-frequency broadband signal that is an intra-frequency signal whose bandwidth is greater than the bandwidth of the WLAN signal of the STA.

In a second possible implementation of the second aspect, generating, by an interference canceller based on the interference signal, a reconstruction signal used to cancel the interference signal received by the first antenna includes coupling the interference signal, and adjusting, based on a configuration, an interference signal obtained through coupling to obtain the reconstruction signal.

In a third possible implementation of the second aspect, the interference canceller includes a phase shifter and an attenuator, and generating, by an interference canceller based on the interference signal, a reconstruction signal used to cancel the interference signal received by the first antenna includes adjusting, by the phase shifter, a phase of the interference signal, and attenuating, by the attenuator, the interference signal.

In a fourth possible implementation of the second aspect, the method further includes, when detecting that a time point of stopping sending the interference signal is currently reached, sending, by the receiver, a stop indication to the jammer, and in response to the stop indication, stop sending, by the jammer, the interference signal.

In a fifth possible implementation of the second aspect, the WLAN signal includes a field indicating an end time of the WLAN signal, the receiver sends, to the jammer, an end indication indicating the end time of the WLAN signal, and the jammer stops sending the interference signal according to the end indication when the WLAN signal is ended or before the WLAN signal is ended.

In a sixth possible implementation of the second aspect, the method further includes enabling, by the receiver, a self-interference cancellation training mode, in the self-interference cancellation training mode, generating, by the jammer, the interference signal, and sending the interference signal using the second antenna, coupling, by the interference canceller, the interference signal, separately adjusting, based on at least one group of configurations, an interference signal obtained through coupling to obtain a training reconstruction signal, and providing the training reconstruction signal for the receiver, detecting, by the interference canceller, a training cancellation effect that is on the receiver and between the training reconstruction signal and the interference signal received by the first antenna, when a training cancellation effect that meets a cancellation condition is obtained, determining a configuration corresponding to the training cancellation effect that meets the cancellation condition as a preferred configuration, and sending the preferred configuration to the receiver, and receiving, by the receiver, the preferred configuration, and disabling the self-interference cancellation training mode.

In a seventh possible implementation of the second aspect, after disabling the self-interference cancellation training mode, the method further includes starting, by the receiver, the jammer and the interference canceller, generating, by the jammer, the interference signal, and sending the interference signal using the second antenna, coupling, by the interference canceller, the interference signal, adjusting, based on the preferred configuration, the interference signal obtained through coupling, to obtain a reconstruction signal, providing the reconstruction signal for the receiver, and detecting a training cancellation effect that is on the receiver and between the reconstruction signal and the interference signal received by the first antenna, sending, by the interference canceller, a disabling notification message to the receiver when the cancellation effect meets the cancellation condition, or sending a training notification message to the receiver when the cancellation effect does not meet the cancellation condition, where the disabling notification message is used to instruct to disable the jammer and the interference canceller, and the training notification message is used to instruct to enable the self-interference cancellation training mode, and closing, by the receiver, the jammer and the interference canceller when the disabling notification message is received, or enabling the self-interference cancellation training mode when the training notification message is received.

In an eighth possible implementation of the second aspect, during the enabling a self-interference cancellation training mode, the method further includes sending a CTSto-self frame, where the CTS-to-self is used to instruct a STA associated with a wireless device to stop sending a WLAN signal in a reserved time period.

DESCRIPTION OF EMBODIMENTS

To make the objectives, technical solutions, and advantages of this disclosure clearer, the following further describes the implementations of this disclosure in detail with reference to the accompanying drawings.

Figure 1A:
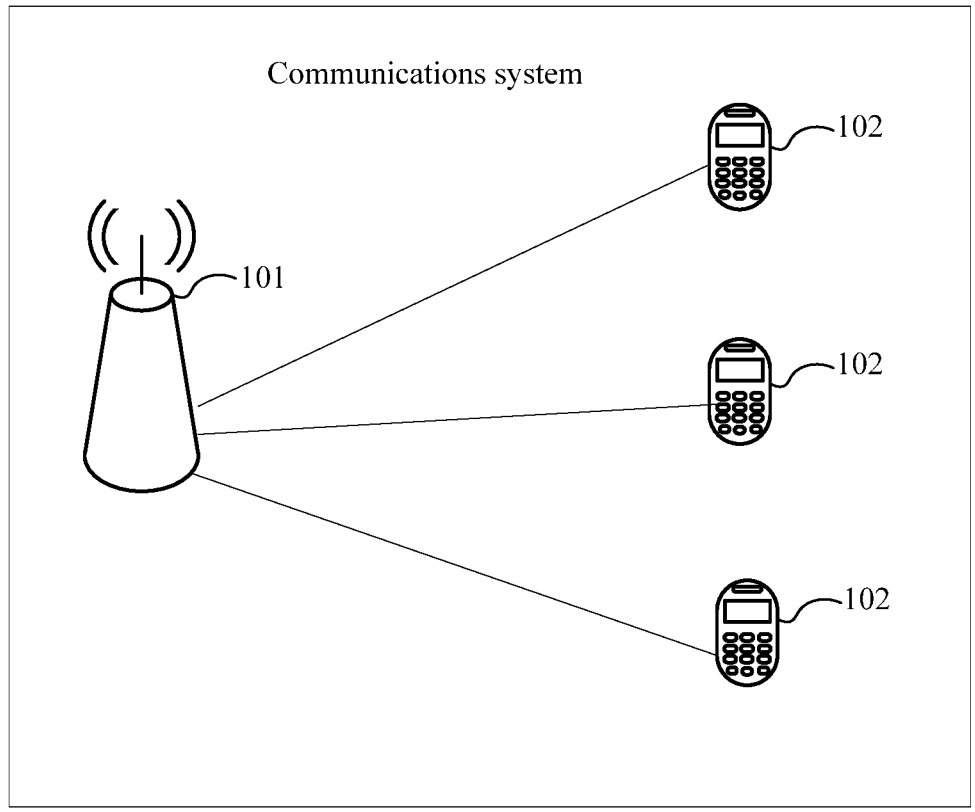
FIG. 1A is a schematic structural diagram of a communications system according to an embodiment of this disclosure.

FIG. 1A is a schematic structural diagram of a communications system according to an embodiment of this disclosure. Referring to FIG. 1A, the communications system includes a wireless access point 101 and a plurality of STAs 102. Each STA 102 is connected to the wireless access point 101 using a wireless network.

Each STA 102 may send a wireless local area network signal, and the wireless access point 101 receives and processes the wireless local area network signal. Alternatively, the wireless access point 101 may send a wireless local area network signal, and the STA 102 receives and processes the wireless local area network signal. The wireless local area network signal may be a signal that carries an uplink data packet, or may be a management frame, a control frame, or the like.

When the communications system is applied to a short coverage scenario, in a process of sending, by a STA 102, a wireless local area network signal on a channel of the wireless access point 101, another STA 102 may listen to the wireless local area network signal, determine that the channel of the wireless access point 101 is in a busy state, and keep silent.

Figure 1B:
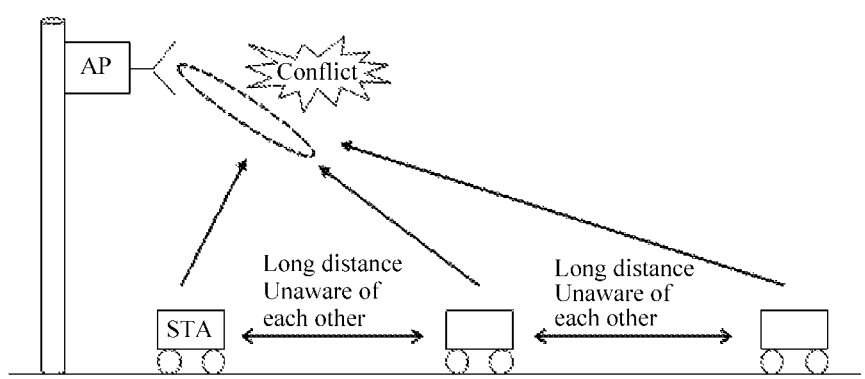
FIG. 1B is a schematic diagram of a wireless local area network signal conflict according to an embodiment of this disclosure.

However, when the communications system is applied to a wide coverage scenario, a distance between different STAs 102 is relatively long, antenna isolation between different STAs 102 is quite large, or heavy obstruction exists between different STAs 102. In this case, the different STAs 102 are mutually hidden nodes. In a process of sending, by a STA 102, a wireless local area network signal on the channel of the wireless access point 101, another STA 102 cannot listen to the wireless local area network signal, and is highly likely to determine that the channel of the wireless access point 101 is in an idle state. In this case, if the other STA 102 sends a wireless local area network signal on the channel, a wireless local area network signal conflict is caused, affecting proper reception of the wireless local area network signal by the wireless access point 101. For example, referring to FIG. 1B, when a WLAN communications system is applied to a wide coverage scenario, a distance between STAs in different vehicles is relatively long, and obstruction exists between the vehicles. In this case, the STAs are mutually hidden nodes, and cannot listen to a wireless local area network signal of each other. When two or more STAs send wireless local area network signals, a conflict occurs, affecting proper reception of a wireless local area network signal.

Likewise, when wireless local area network signals sent by two or more wireless access points that are mutually hidden nodes reach a STA, a conflict also occurs, affecting proper reception of a wireless local area network signal by the STA.

To avoid a wireless local area network signal conflict problem, in the embodiments of this disclosure, when detecting a wireless local area network signal, a wireless device sends an interference signal on a channel on which the wireless local area network signal is located, generates, based on the interference signal, a reconstruction signal used to cancel the interference signal received by a first antenna, and provides the reconstruction signal at an output end. This avoids a wireless local area network signal conflict, can further cancel interference in a receiver in a process of sending the interference signal, and ensures proper reception of the wireless local area network signal.

The wireless device may be the wireless access point 101, or may be the STA 102.

Figure 2:
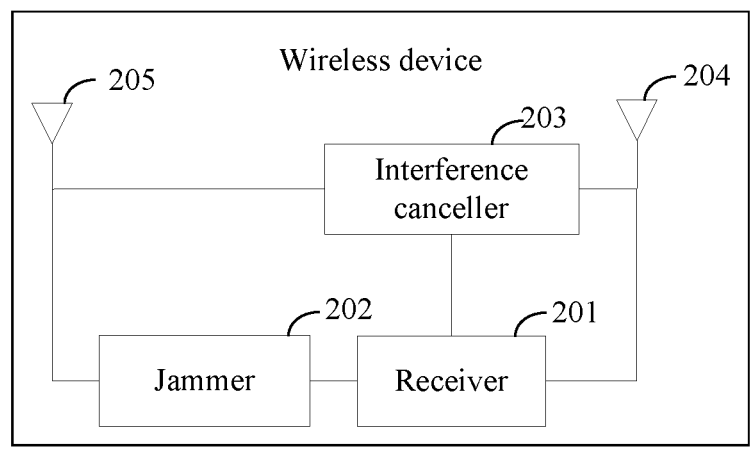
FIG. 2 is a schematic structural diagram of a wireless device according to an embodiment of this disclosure.

FIG. 2 is a schematic structural diagram of a wireless device according to an embodiment of this disclosure. Referring to FIG. 2, the wireless device includes a receiver 201, a jammer 202, an interference canceller 203, a first antenna 204, and a second antenna 205. The receiver 201 is connected to the jammer 202, the receiver 201 is connected to the interference canceller 203, and the receiver 201 is connected to the first antenna 204. The jammer 202 is connected to the second antenna 205. An input end of the interference canceller 203 is connected to the second antenna 205, and an output end of the interference canceller 203 is connected to the first antenna 204.

The first antenna 204 is a receive antenna and configured to receive a wireless local area network signal. The second antenna 205 is a transmit antenna and configured to send an interference signal, another signal, or the like. The first antenna 204 and the second antenna 205 each may be a high gain directional antenna, an omnidirectional antenna, a polarization antenna, or the like. The receiver 201 is a part of a transceiver. During actual application, when sending or receiving a signal, the transceiver may use the first antenna 204 or the second antenna 205.

The receiver 201 detects a wireless local area network signal. In response to that the receiver 201 detects the wireless local area network signal, the jammer 202 sends, using the second antenna 205, an interference signal on a channel on which the wireless local area network signal is located.

The wireless device may be a wireless access point, and a device sending a wireless local area network signal may be a STA associated with the wireless access point. Alternatively, the wireless device may be a STA, and a device sending a wireless local area network signal may be a wireless access point or another STA. Because a wireless access point is a STA having a management function and a control function, a device sending a wireless local area network signal may be collectively referred to as a STA.

That the jammer 202 responds to that the receiver 201 detects the wireless local area network signal may include, in response to that the receiver 201 detects the wireless local area network signal, immediately sending, by the jammer 202, the interference signal, or in response to that the receiver 201 detects the wireless local area network signal, sending, by the jammer 202, the interference signal after a period of time.

Regarding a manner for determining whether the wireless local area network signal is detected, in a possible implementation, a detection manner may include any one of the following In a first manner, the wireless device receives the wireless signal, performs synchronization detection on a synchronization field in the wireless signal, and determines, when the synchronization detection is completed, that the wireless local area network signal is detected.

In a possible implementation, the synchronization field may be a legacy signal field (also referred to as L-SIG), a high throughput signal field (also referred to as HT-SIG), a very high throughput signal field (also referred to as VHT-SIG), a legacy short training field (also referred to as L-STF), a high throughput short training field (also referred to as HT-STF), a very high throughput short training field (also referred to as VHT-STF), a legacy long training field (also referred to as L-LTF), a high throughput long training field (also referred to as HT-LTF), a very high throughput long training field (also referred to as VHT-LTF), or any combination thereof.

Figure 3:
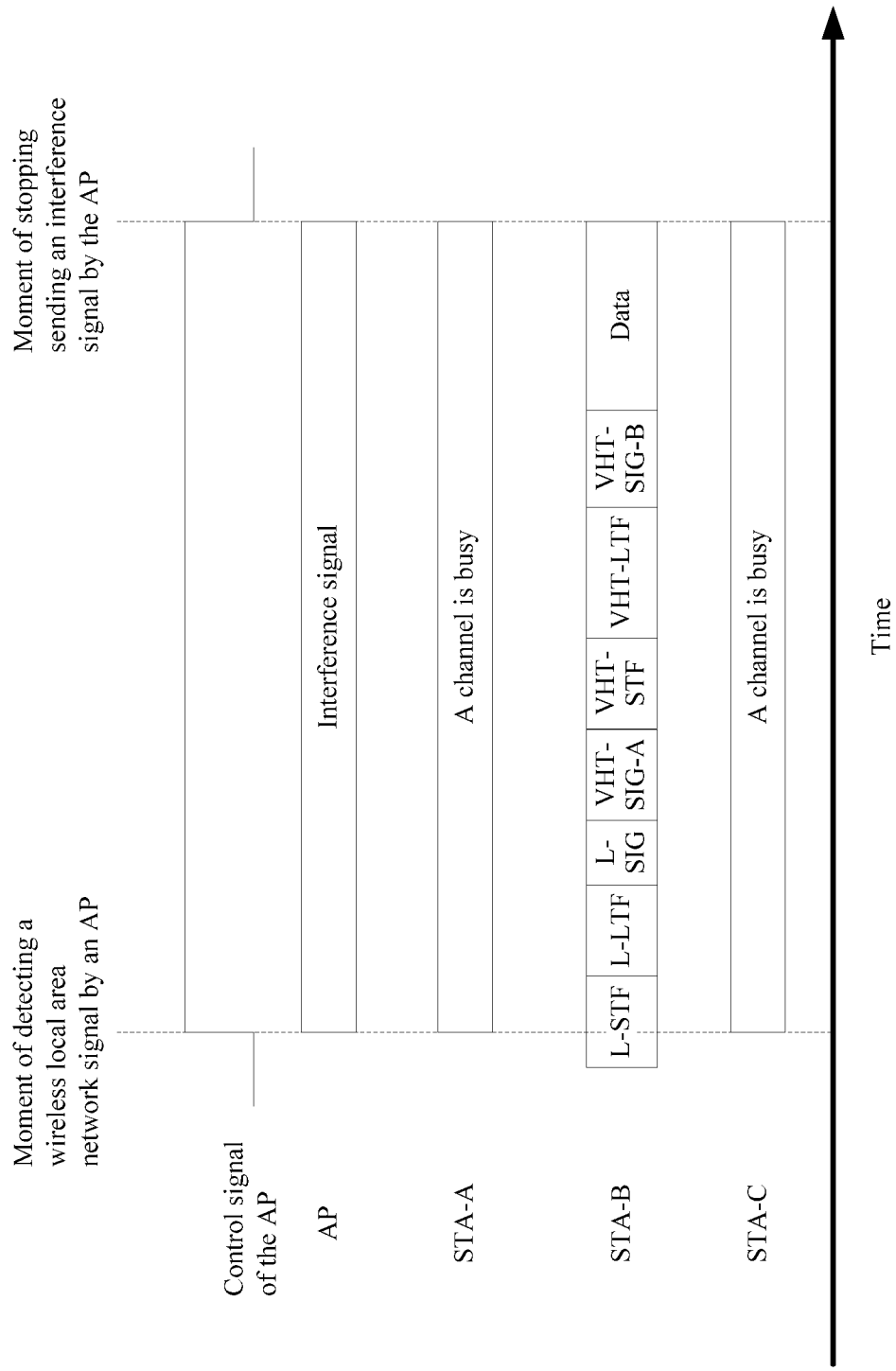
FIG. 3 is a schematic diagram of an interference signal sending moment according to an embodiment of this disclosure.

Referring to FIG. 3, a STA-B sends a wireless signal. When completing synchronization detection on an L-STF in the wireless signal, an AP detects the wireless local area network signal. In this case, the AP delivers an interference signal, a STA-A and a STA-C listen to the interference signal, determine that a channel is in a busy state, keep silent, and do not send a wireless local area network signal.

In a second manner, the wireless device may receive the wireless signal, check a cyclic redundancy check code in a received wireless signal, and when the CRC check succeeds, determines that the wireless local area network signal is detected.

In a third manner, the wireless local area network signal may include a preamble part and a data part. When sending the wireless local area network signal, a STA first sends the preamble part and then the data part. Correspondingly, in a process of receiving the wireless local area network signal, the wireless device first receives the preamble part and then the data part. The wireless device may first receive the preamble in the wireless signal, attempt to demodulate the preamble in a received wireless signal, and when demodulating the preamble is completed, determine that the wireless local area network signal is detected.

Certainly, the foregoing three manners are merely optional manners. During actual application, another manner may be used to determine whether the wireless local area network signal is detected. For example, the wireless device attempts to demodulate the preamble in the wireless signal, and in a period of time after the demodulating the preamble is completed, determines that the wireless local area network signal is detected.

Regarding the channel on which the wireless local area network signal is located, when at least one STA applies for association authentication to the wireless device, a channel on which each STA device is located is determined. Therefore, when detecting a wireless local area network signal sent by a STA, the receiver 201 may directly determine a channel on which the wireless local area network signal is located, and send an interference signal on the channel.

The STA sending the wireless local area network signal is currently in a sending state, and does not listen to a channel of the wireless device, and STAs other than the STA sending the wireless local area network signal listen to the channel of the wireless device. Therefore, when receiving the interference signal, these STAs can determine that the channel of the wireless device is in a busy state, keep silent, and stop sending a wireless local area network signal. In this case, it can be ensured that only one STA sends a wireless local area network signal on the channel of the wireless device, thereby avoiding a wireless local area network signal conflict.

Figure 4:
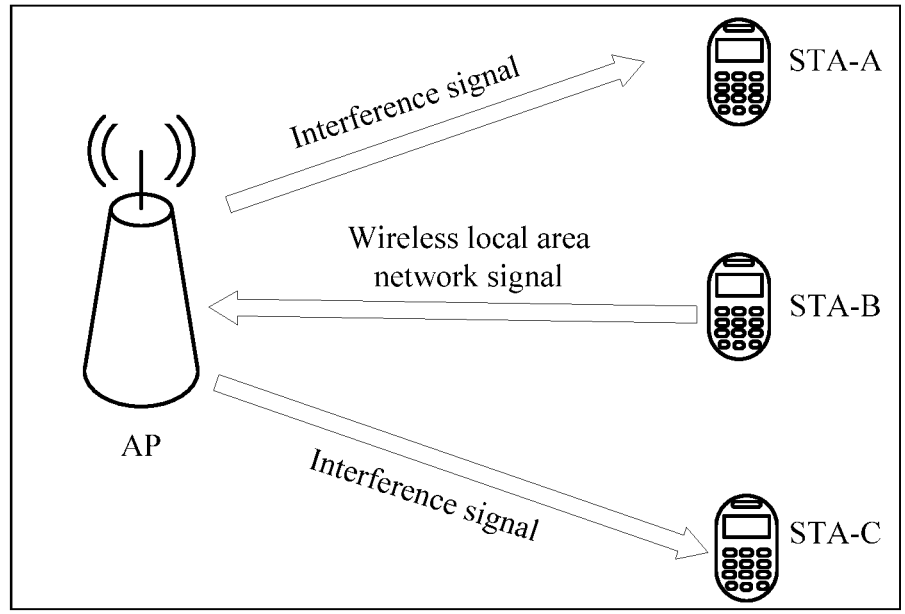
FIG. 4 is a schematic diagram of a wireless local area network signal and an interference signal according to an embodiment of this disclosure.

Referring to FIG. 4, in a process of receiving, by an AP, a wireless local area network signal from a STA-B, the AP sends an interference signal such that another STA does not send a wireless local area network signal.

Regarding a type of the interference signal, the interference signal may include a plurality of types such as the following types.

A first type: a local oscillator (LO) signal or a monophonic signal whose frequency is within band of the wireless local area network signal. The local oscillator signal and the monophonic signal may be a sine signal or a cosine signal.

A second type: an intra-frequency narrowband signal that is an intra-frequency signal whose bandwidth is less than the bandwidth of the wireless local area network signal.

A third type: an intra-frequency same-band signal that is an intra-frequency signal whose bandwidth is equal to the bandwidth of the wireless local area network signal.

A fourth type: an intra-frequency broadband signal that is an intra-frequency signal whose bandwidth is greater than the bandwidth of the wireless local area network signal.

In a process of delivering the interference signal by the second antenna 205, the interference signal is sent using the second antenna 205, and may be transmitted to the first antenna 204 and received by the first antenna 204, consequently causing interference in the wireless local area network signal received by the first antenna 204. In view of this, the interference canceller 203 is disposed in the wireless device. The interference canceller 203 generates, based on the interference signal from the input end, a reconstruction signal used to cancel the interference signal received by the first antenna 204, and provides the reconstruction signal at the output end. In this way, interference of the interference signal may be canceled using the reconstruction signal.

In a possible implementation, the interference canceller 203 couples the interference signal from the input end, and adjusts, based on a determined configuration, an interference signal obtained through coupling to obtain the reconstruction signal.

The configuration is used to determine a manner for adjusting the interference signal obtained through coupling, and may include a phase adjustment magnitude, an amplitude adjustment magnitude, and the like. The reconstruction signal is used to cancel the interference signal that is sent using the second antenna 205 and that is then transmitted to the first antenna 204, that is, the interference signal received by the first antenna 204. For example, amplitude of the reconstruction signal may be equal to amplitude of the interference signal received by the first antenna 204, and a phase of the reconstruction signal is opposite to a phase of the interference signal. In this way, the interference signal received by the first antenna 204 can be canceled. Alternatively, the amplitude of the reconstruction signal may be approximately equal to the amplitude of the interference signal received by the first antenna 204, and the phase of the reconstruction signal is opposite to the phase of the interference signal.

Figure 5:
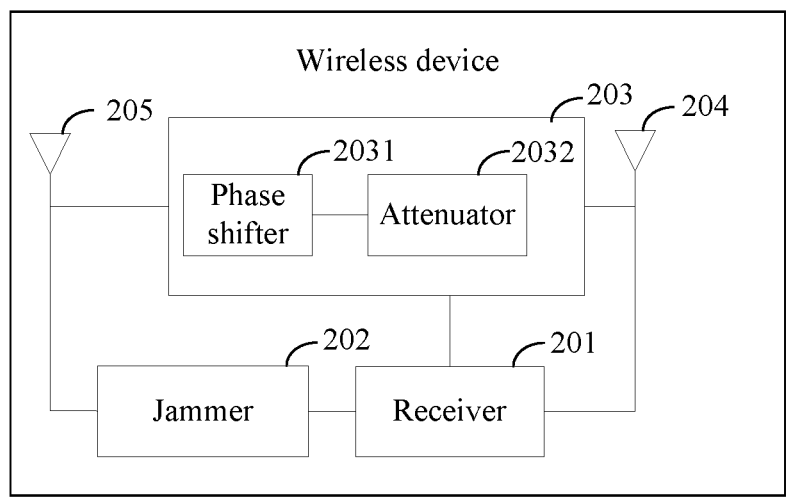
FIG. 5 is a schematic structural diagram of another wireless device according to an embodiment of this disclosure.

Optionally, referring to FIG. 5, the interference canceller 203 includes a phase shifter 2031 and an attenuator 2032. The phase shifter 2031 adjusts a phase of an interference signal from an input end, and the attenuator 2032 attenuates amplitude of the interference signal from the input end. In this case, after the interference signal from the input end of the interference canceller 203 passes through the phase shifter 2031 and the attenuator 2032, amplitude of a reconstruction signal obtained from an output end is equal to amplitude of the interference signal received by the first antenna 204, and a phase of the reconstruction signal is opposite to a phase of the interference signal.

During actual application, as shown in FIG. 5, the input end of the interference canceller 203 may be connected to the phase shifter 2031, the phase shifter 2031 is connected to the attenuator 2032, and the attenuator 2032 is connected to the output end. The interference signal from the input end of the interference canceller 203 first passes through the phase shifter 2031 for phase adjustment, and then passes through the attenuator 2032 for amplitude adjustment. Further, the reconstruction signal is obtained from the output end. Alternatively, in another possible implementation, the input end of the interference canceller 203 may be connected to the attenuator 2032, the attenuator 2032 is connected to the phase shifter 2031, and the phase shifter 2031 is connected to the output end. The interference signal from the input end of the interference canceller 203 first passes through the attenuator 2032 for amplitude adjustment, and then passes through the phase shifter 2031 for phase adjustment. Further, the reconstruction signal is obtained from the output end.

If the phase changes excessively in a process of transmitting the interference signal from the second antenna to the first antenna, the phase of the interference signal received by the first antenna also changes excessively. In this case, the interference canceller 203 needs to make a relatively large adjustment to the phase of the interference signal from the input end. When the phase shifter in the interference canceller 203 has a relatively small phase adjustment, a phase inverter may be disposed in the interference canceller 203. To be specific, the interference canceller 203 may further include the phase shifter, the phase inverter, and the attenuator. The phase inverter may adjust a phase of a signal by 180 degrees, i.e., the phase is adjusted to an inverse phase.

For example, the phase of the interference signal is decreased by 170 degrees in a transmission process. In this case, the phase of the interference signal received by the first antenna is 170 degrees less than the phase of the original interference signal. However, a phase adjustment magnitude of a phase shifter is only 10 degrees to 20 degrees. Therefore, the phase of the interference signal from the input end is increased by 180 degrees using the phase inverter, and then the phase is decreased by 10 degrees using the phase shifter. This can ensure that, after the phase adjustment, the phase of the reconstruction signal is opposite to the phase of the interference signal received by the first antenna.

In a self-interference cancellation process, a wireless device may continuously receive and demodulate a wireless local area network signal. In a process of sending an interference signal, the receiver 201 detects whether a time point of stopping sending the interference signal is currently reached, and sends a stop indication to the jammer 202 when detecting that the time point of stopping sending the interference signal is currently reached. In response to the stop indication sent by the receiver 201, the jammer 202 stops sending the interference signal.

The receiver 201 may detect whether receiving the wireless local area network signal is completed, to detect whether the time point of stopping sending the interference signal is currently reached. Alternatively, the wireless local area network signal includes a field indicating an end time of the wireless local area network signal, and the receiver 201 may detect, based on the field, whether the time point of stopping sending the interference signal is currently reached.

When receiving the stop indication, the jammer 202 may immediately respond and immediately stop sending the interference signal, or may respond and stop sending the interference signal in a period of time after the stop indication is received.

Alternatively, the wireless local area network signal includes the field indicating the end time of the wireless local area network signal, and the field may include an end time point of the wireless local area network signal or include length of the wireless local area network signal. The end time point of the wireless local area network signal may be determined based on the length of the wireless local area network signal. The receiver 201 may send, to the jammer 202, an end indication indicating the end time of the wireless local area network signal, and the jammer 202 stops sending the interference signal according to the end indication when the wireless local area network signal is ended. In this case, sending the interference signal may be stopped when receiving the wireless local area network signal is completed. In a subsequent process, a STA associated with the wireless device may listen to a channel that is in an idle state, and can send a wireless local area network signal. Alternatively, the jammer 202 stops sending the interference signal according to the end indication before the wireless local area network signal is ended. In this case, sending the interference signal is stopped immediately before receiving the wireless local area network signal is completed, and a delay present in a process of sending the interference signal from the wireless device to a STA is considered. This ensures that a wireless local area network signal sent by the STA can reach the wireless device in preset duration, and that the interference signal sent by the wireless device can reach the STA. Then, after sending the wireless local area network signal and sending the interference signal are complete, a STA associated with the wireless device can listen, in a timely manner, to the channel that is in the idle state, and can send a wireless local area network signal on the channel.

It should be noted that the interference canceller 203 in this embodiment of this disclosure may be applied to a communications system in any scenario, or applied to a scenario in which the first antenna 204 and the second antenna 205 are shared or a scenario in which isolation between the first antenna 204 and the second antenna 205 is quite small. In these scenarios, the interference signal sent by the second antenna 205 causes interference to the first antenna 204 and affects proper reception of a wireless local area network signal by the wireless device. Therefore, self-interference cancellation needs to be performed.

In a scenario in which the first antenna 204 and the second antenna 205 are not shared and isolation in between is quite large, the interference signal sent by the second antenna 205 causes quite small interference to the first antenna 204, and does not affect proper reception of a wireless local area network signal by the wireless device. In this case, the interference canceller 203 does not need to be disposed in the wireless device, and self-interference cancellation does not need to be performed, either.

When detecting a wireless local area network signal from a STA, the wireless device provided in this embodiment of this disclosure sends an interference signal on a channel on which the wireless local area network signal is located. The wireless device generates, based on the interference signal, a reconstruction signal used to cancel the interference signal received by the first antenna, and provides the reconstruction signal at the output end. In this way, the wireless device is not affected by the interference signal sent by the wireless device. The STA sending the wireless local area network signal does not receive the interference signal at the same time, and therefore can properly send the wireless local area network signal. When listening to the interference signal on the channel, a STA other than the STA sending the wireless local area network signal determines that the channel is in a busy state, and keeps silent. This avoids a wireless local area network signal conflict. Sending the interference signal at the time of receiving the wireless local area network signal occupies no additional air interface resource, and a decrease in an overall throughput of a communications system is avoided.

With reference to structures shown in FIG. 1 and FIG. 5, a function of each unit in the wireless device is described as follows.

1. Functions of the receiver 201 include the following.
(1) Exchange information with the jammer 202 and the interference canceller 203, determine policies such as start and stop occasions of a self-interference cancellation process and a type of an interference signal.

(2) Complete digital signal processing at a physical layer and a data link layer, and be responsible for determining whether a wireless local area network signal is detected.

(3) Control the jammer 202 to control parameters such as a time of sending the interference signal and a time of stopping sending the interference signal, power of the interference signal, and bandwidth of the interference signal.

(4) Control the interference canceller 203, perform detailed control on a configuration used to adjust an interference signal obtained through coupling, and monitor a cancellation effect.

(5) Provide the following parameters: a frequency of the interference signal, the bandwidth of the interference signal, a selected type of the interference signal, and a configuration in the self-interference cancellation process, including an amplitude adjustment magnitude and a phase adjustment magnitude.

2. Functions of the jammer 202 include the following.
(1) Generate an interference signal, and send the interference signal to an air interface.
(2) Be controlled by the receiver 201, and feedback information such as the bandwidth and power of the interference signal to the receiver 201.

3. Functions of the interference canceller 203 include the following.
(1) Couple the interference signal output by the jammer 202, adjust parameters such as amplitude and a phase of a part of the interference signal obtained through coupling, reconstruct the interference signal that is transmitted to the first antenna through the air interface, and then perform self-interference cancellation.
(2) Be controlled by the receiver 201, and feedback information such as the cancellation effect to the receiver 201.

The receiver 201, the jammer 202, and the interference canceller 203 may be implemented as a device such as a WLAN communications chip, a field-programmable gate array (FPGA), a digital signal processor (DSP), a central processing unit (CPU), or an application-specific integrated circuit (ASIC), may be integrated in a same chip, or may be jointly implemented by a plurality of chips. Each unit may be implemented by a digital part, implemented by an analog part, or jointly implemented by the analog part and the digital part, and a signal interaction interface of each unit may be a general-purpose input/output (GPIO), a serial peripheral interface (SPI), or the like.

In the foregoing possible implementation, the interference canceller 203 may adjust, based on a specified configuration, the interference signal obtained through coupling. The configuration may include the amplitude adjustment magnitude and the phase adjustment magnitude.

During actual application, a setting of the configuration affects amplitude and a phase of a reconstruction signal and further affects the cancellation effect of the self-interference cancellation. An inappropriate setting of the configuration may cause a relatively big difference between the reconstruction signal obtained through adjustment based on the configuration and the interference signal transmitted to the first antenna 204, and consequently the interference signal cannot be canceled. Therefore, to improve the cancellation effect, the wireless device may determine a preferred configuration through training.

The receiver 201 enables a self-interference cancellation training mode and starts training. In response to that the receiver 201 enables the self-interference cancellation training mode, the jammer 202 generates the interference signal, and sends the interference signal using the second antenna

205. The interference canceller 203 couples the interference signal from the input end, separately adjusts, based on at least one group of configurations, the interference signal obtained through coupling to obtain a training reconstruction signal, and provides the training reconstruction signal at the output end. The interference canceller 203 further detects a training cancellation effect that is at the output end and between the training reconstruction signal and the interference signal received by the first antenna, and determines whether the training cancellation effect meets a cancellation condition. When the currently determined training cancellation effect meets the cancellation condition, it indicates that the interference signal transmitted to the first antenna 204 can be canceled after the interference signal obtained through coupling is adjusted based on a current configuration, and the configuration corresponding to the training cancellation effect that meets the cancellation condition is determined as the preferred configuration.

When the currently determined training cancellation effect does not meet the cancellation condition, it indicates that the interference signal transmitted to the first antenna 204 cannot be canceled after the interference signal obtained through coupling is adjusted based on the current configuration. In this case, a next group of configurations needs to be determined, and the interference signal obtained through coupling continues to be adjusted based on the next group of configurations to obtain a training cancellation effect corresponding to the next group of configurations. When a training cancellation effect that meets the cancellation condition is obtained, a configuration corresponding to the training cancellation effect that meets the cancellation condition is determined as the preferred configuration and sent to the receiver 201. The receiver 201 receives the preferred configuration, and disables the self-interference cancellation training mode.

Each group of configurations includes an amplitude adjustment magnitude and a phase adjustment magnitude. Certainly, each group of configurations may also include other information, and adjustment magnitudes in different groups of configurations are not exactly the same. Each group of configurations indicates an adjustment manner. Different configurations indicate different adjustment manners, and obtained cancellation effects are also different. The cancellation effect may be indicated by a residual interference signal between the reconstruction signal and the interference signal received by the first antenna 204. The cancellation condition may be that the residual interference signal between the reconstruction signal and the interference signal received by the first antenna 204 is less than a threshold. To be specific, only when the residual interference signal is less than the threshold, it is considered that the cancellation effect meets the cancellation condition. A specific value of the threshold may be determined based on a precise requirement. The threshold may be a preset energy, and the cancellation condition is that energy of the residual interference signal is less than the preset energy. Alternatively, the threshold may be a preset amplitude, and the cancellation condition is that amplitude of the residual interference signal is less than the preset amplitude, or the like.

Regarding an occasion of enabling the self-interference cancellation training mode, the receiver 201 may enable the self-interference cancellation training mode in an idle state, or may periodically enable the self-interference cancellation training mode. After the training is completed, the receiver 201 may disable the self-interference cancellation training mode.

In another possible implementation, after the training is completed, the receiver 201 may obtain and store a trained preferred configuration. Considering that an external environment change affects the interference signal transmitted to and received by the first antenna 204, even though the training is completed, when an external environment changes or another problem arises, it is likely that the preferred configuration cannot achieve the cancellation effect that meets the cancellation condition, and self-interference cannot be canceled. Therefore, after the training is completed, the cancellation effect may further be monitored, and whether retraining is to be performed is determined based on the cancellation effect.

The receiver 201 starts the jammer 202 and the interference canceller 203, and delivers the preferred configuration to the interference canceller 203. The jammer 202 generates the interference signal, and sends the interference signal using the second antenna 205. The interference canceller 203 adjusts, based on the preferred configuration, the interference signal obtained through coupling to obtain the reconstruction signal, and determines the cancellation effect based on the reconstruction signal and the interference signal received by the first antenna 204. The interference canceller 203 determines whether the cancellation effect meets the cancellation condition, and sends a disabling notification message to the receiver 201 when the cancellation effect meets the cancellation condition, or sends a training notification message to the receiver 201 when the cancellation effect does not meet the cancellation condition. The disabling notification message is used to instruct to disable the jammer 202 and the interference canceller 203, and the training notification message is used to instruct to enable the self-interference cancellation training mode.

When the receiver 201 receives the disabling notification message, it indicates that the current external environment does no change excessively and the interference signal received by the first antenna 204 can be canceled using the current preferred configuration, and retraining is not required. Therefore, the receiver 201 disables the jammer 202 and the interference canceller 203, and stops detection.

When the receiver 201 receives the training notification message, it indicates that the external environment changes and may cause that the interference signal received by the first antenna 204 cannot be canceled using the current preferred configuration, and retraining is required. Therefore, the receiver 201 enables the self-interference cancellation training mode, performs retraining in the self-interference cancellation training mode, determines a preferred configuration appropriate for a current external environment, and stores the preferred configuration, to implement configuration update. Then, if the interference signal is to be delivered, self-interference cancellation may be performed based on the stored preferred configuration.

A configuration update process may start at any moment, start in a period of time after the training is completed, or start before the wireless device is ready to receive data.

In another possible implementation, the wireless device may send a wireless local area network signal in combination with an RTS-CTS mechanism such that a wireless local area network signal conflict can be avoided in a more reliable manner.

When enabling the self-interference cancellation training mode, the receiver 201 sends a clear to send-to-self frame. Different from a CTS, the CTS-to-self carries a receive address. The receive address is set to an address of a local wireless device end. Therefore, after sending the CTS-to-self, the local wireless device end can receive the CTS-to-self.

The CTS-to-self is used to instruct a STA associated with the wireless device to stop sending a wireless local area network signal in a reserved time period. This is equivalent to that the receiver 201 sends a CTS to the local wireless device end. In this case, the STA cannot send a wireless local area network signal in the reserved time period. In the reserved time period, the first antenna 204 receives no wireless local area network signal, but receives only the interference signal. In this way, interference in the wireless local area network signal can be excluded, and training is performed based on only the reconstruction signal and the interference signal transmitted to the first antenna 204 to determine the preferred configuration, thereby improving accuracy of a training procedure, and improving the cancellation effect.

An antenna used to send the CTS-to-self may be the second antenna 205 used to send the interference signal, or may be another transmit antenna on the wireless device.

In another possible implementation, when the sent interference signal is an LO signal, direct-current calibration may be further performed. The direct-current calibration function may provide a capability of canceling partial interference. After the training is completed, the receiver 201 controls an operation of a direct-current calibration module on the first antenna 204. After direct-current calibration is completed, the receiver 201 is notified, and updated direct-current calibration information is reported to the receiver 201 and stored in the receiver 201.

The wireless device in the foregoing embodiments may include the following several specific implementations.

Figure 6A:
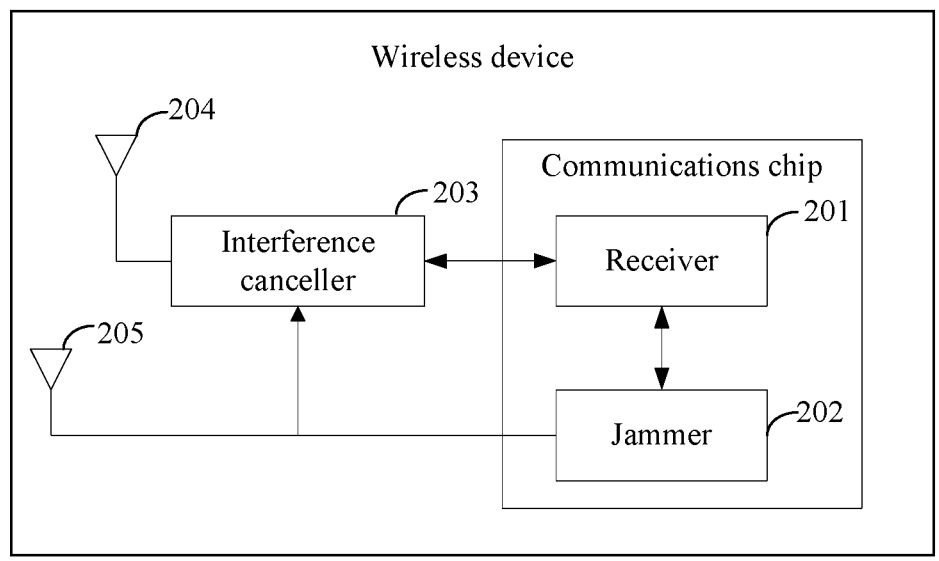
FIG. 6A is a schematic structural diagram of another wireless device according to an embodiment of this disclosure.

In a first implementation, referring to FIG. 6A, a wireless device includes a communications chip. A receiver 201 and a jammer 202 are located inside the communications chip, and an interference canceller 203 is located outside the communications chip. The communications chip may be a WLAN communications chip, or the like.

In a possible implementation, the wireless device further includes a front end module (FEM). The FEM is located outside the communications chip, and in the FEM, devices such as a power amplifier (PA), a radio frequency switch, a low noise amplifier (LNA) may be integrated into a same chip.

Figure 6B:
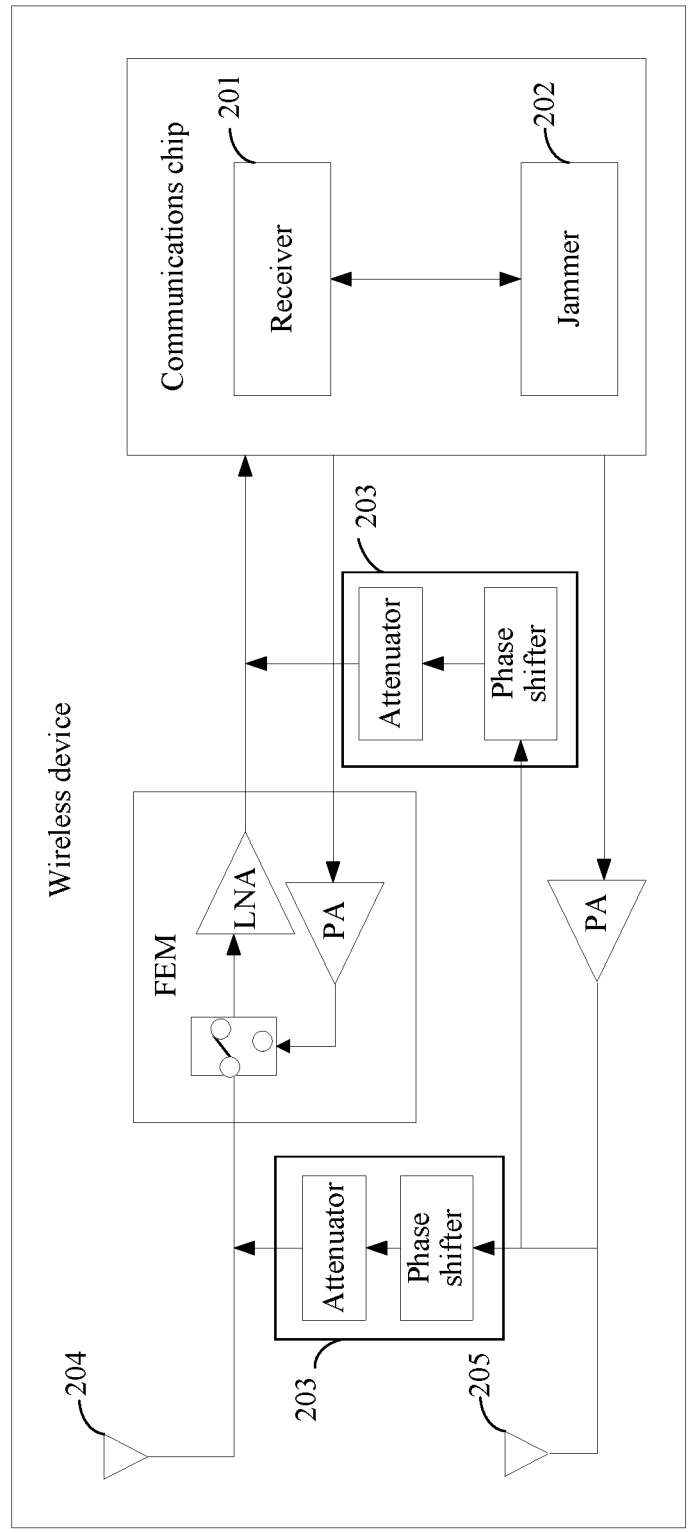
FIG. 6B is a schematic structural diagram of another wireless device according to an embodiment of this disclosure.

In a first case, the communications chip is connected to the interference canceller 203 using the FEM, an input end of the interference canceller 203 is connected to a second antenna 205, and an output end is connected to a first antenna 204. In a second case, the communications chip is connected to the FEM using the interference canceller 203, the input end of the interference canceller 203 is connected to the second antenna 205, the output end is connected to the FEM, and the FEM is connected to the first antenna 204. In a third case, multilevel of interference cancellers may be disposed, and the interference cancellers 203 may be added to both a front end and a back end of the FEM. Referring to FIG. 6B, an FEM includes a radio frequency switch, a PA, and an LNA. Interference cancellers are disposed at both a front end and a back end of the FEM, and the interference cancellers each include a phase shifter and an attenuator.

From a perspective of implementing the foregoing first structure, a peripheral circuit of the communications chip is simple, and relatively large antenna isolation can be used, to reduce a difficulty in implementing self-interference cancellation.

Figure 7A:
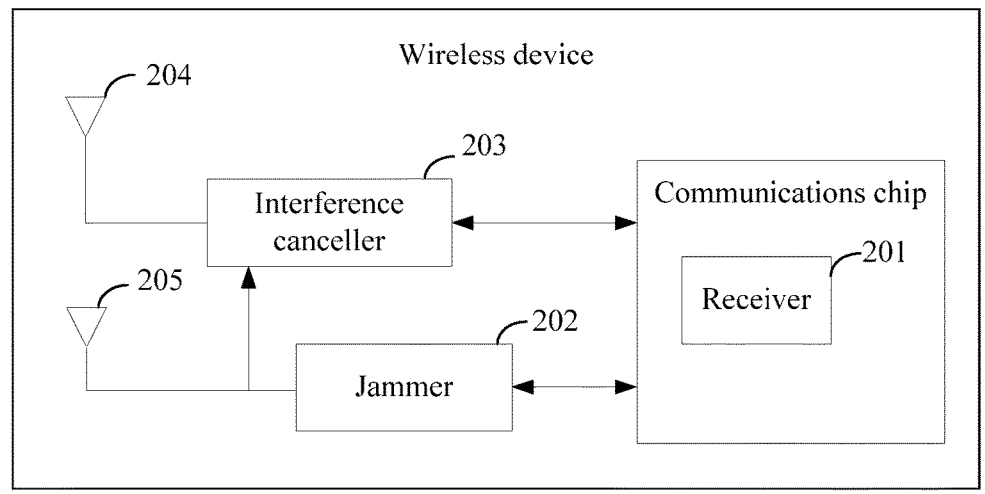
FIG. 7A is a schematic structural diagram of another wireless device according to an embodiment of this disclosure.

In a second implementation, referring to FIG. 7A, a wireless device includes a communications chip. A receiver 201 is located inside the communications chip, and a jammer 202 and an interference canceller 203 are located outside the communications chip.

Figure 7B:
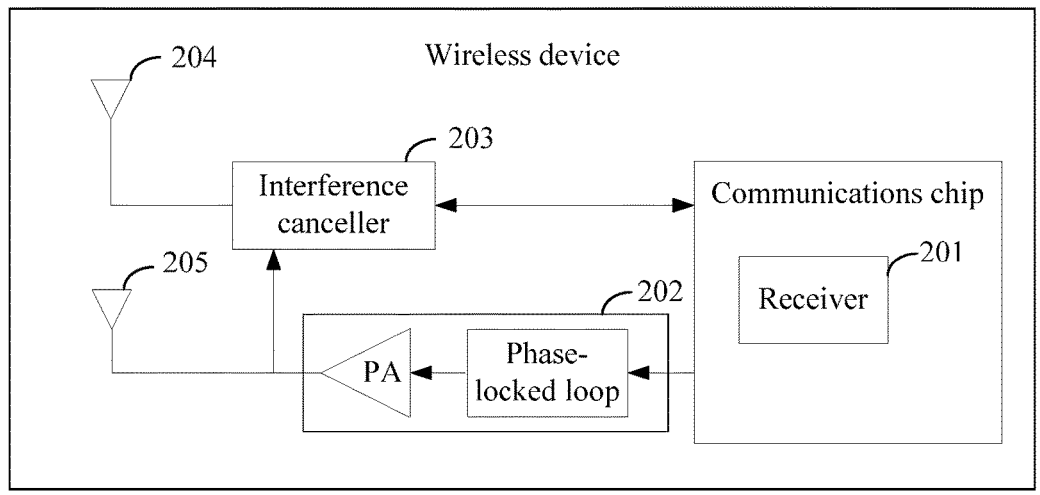
FIG. 7B is a schematic structural diagram of another wireless device according to an embodiment of this disclosure.

In a first case, referring to FIG. 7B, a jammer 202 includes a phase-locked loop and a PA. A communications chip is connected to the phase-locked loop, the phase-locked loop is connected to the PA, and the PA is connected to a second antenna 205. The communications chip may provide information such as a sending moment and transmit power for the phase-locked loop. The phase-locked loop outputs a monophonic signal, the PA amplifies the monophonic signal, to obtain an interference signal, and the second antenna 205 sends the interference signal.

In a second case, a first antenna may serve as a receive antenna, and may serve as a transmit antenna.

A switch is disposed on an output pin of the communications chip. The switch is configured to control the output pin to connect to a first end of the switch or a second end of the switch. The first end is connected to the first antenna 204, the second end is connected to an input end of the jammer 202, an output end of the jammer 202 is connected to the second antenna 205, and the second antenna 205 is configured to send an interference signal generated by the jammer 202.

Therefore, based on a transmission branch including the first antenna 204, an extra interference signal transmission branch including the second antenna 205 and the jammer 202 is added. The two transmission branches share the output pin of the communications chip, and the switch disposed on the output pin is used to control a to-be-used transmission branch.

Considering that the first antenna 204 not only serves as the transmit antenna, but also may serve as the receive antenna, to prevent the interference signal sent by the second antenna 205 from interfering with a wireless local area network signal received by the first antenna 204, an interference canceller 203 may be located between the first antenna 204 and the second antenna 205 such that the interference signal transmitted to the first antenna 204 is canceled based on the interference signal sent by the second antenna 205.

Figure 7C:
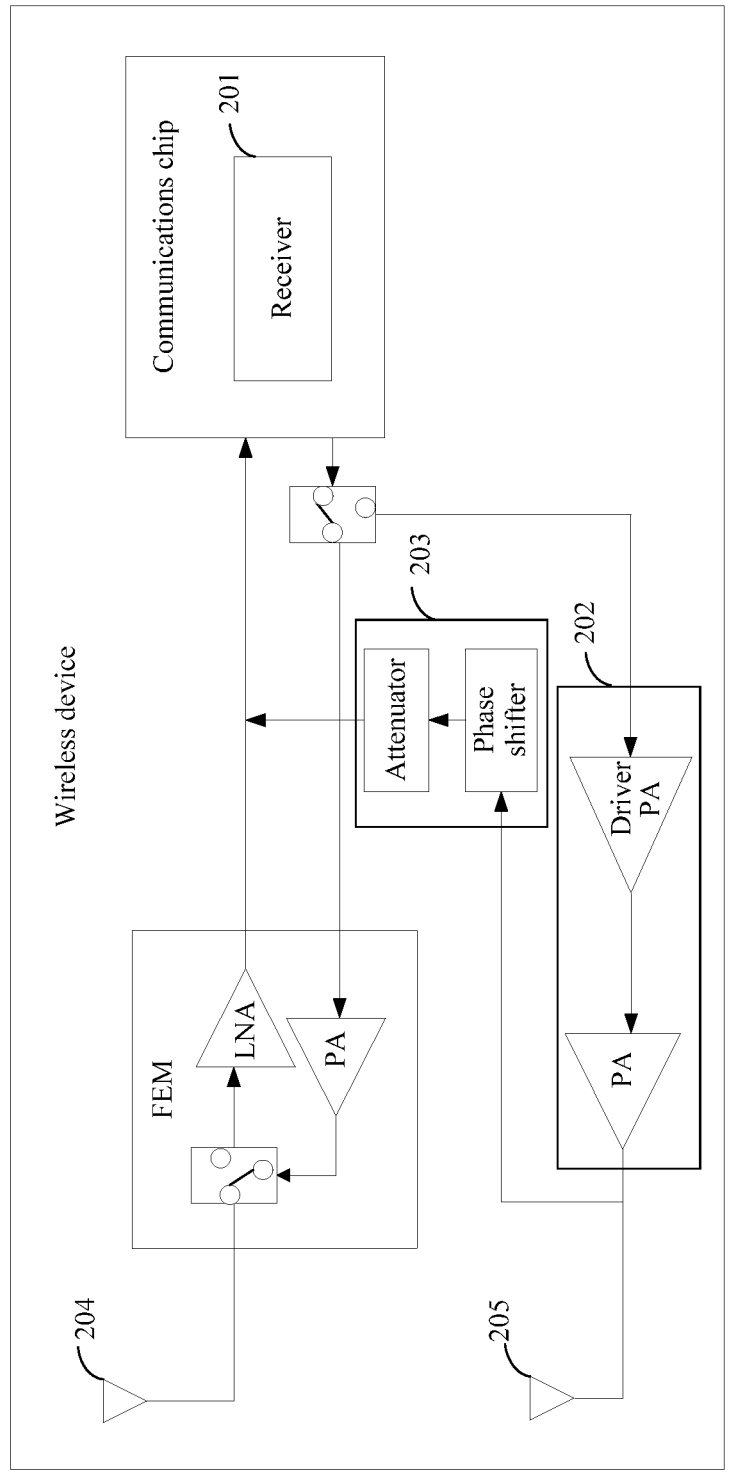
FIG. 7C is a schematic structural diagram of another wireless device according to an embodiment of this disclosure.
Figure 7D:
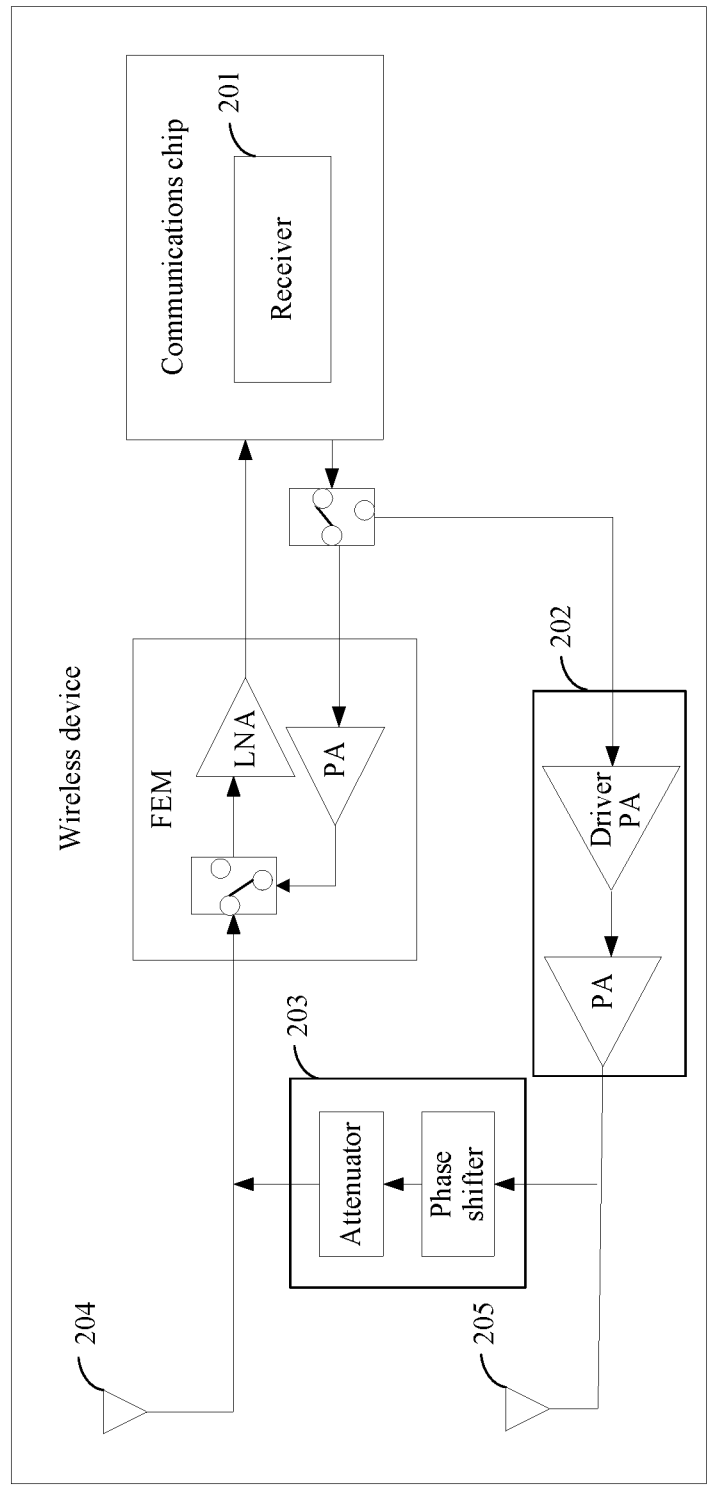
FIG. 7D is a schematic structural diagram of another wireless device according to an embodiment of this disclosure.

Referring to FIG. 7C and FIG. 7D, a jammer 202 includes a driver power amplifier (Driver PA) and a PA. An output end of the jammer 202 is connected to an input end of an interference canceller 203. A difference lies in that an output end of an interference canceller 203 in FIG. 7C is connected to a front end of a FEM, while an interference canceller 203 in FIG. 7D is connected to a back end of a FEM.

From a perspective of implementing the foregoing second structure, implementation inside the communications chip is simple, and a peripheral circuit is relatively simple.

In a third implementation, a wireless device includes a communications chip. A receiver 201, a jammer 202, and an interference canceller 203 are located inside the communications chip.

In a fourth implementation, a wireless device includes one or more chips. A receiver 201, a jammer 202, and an interference canceller 203 are located outside any chip.

Figure 8A:
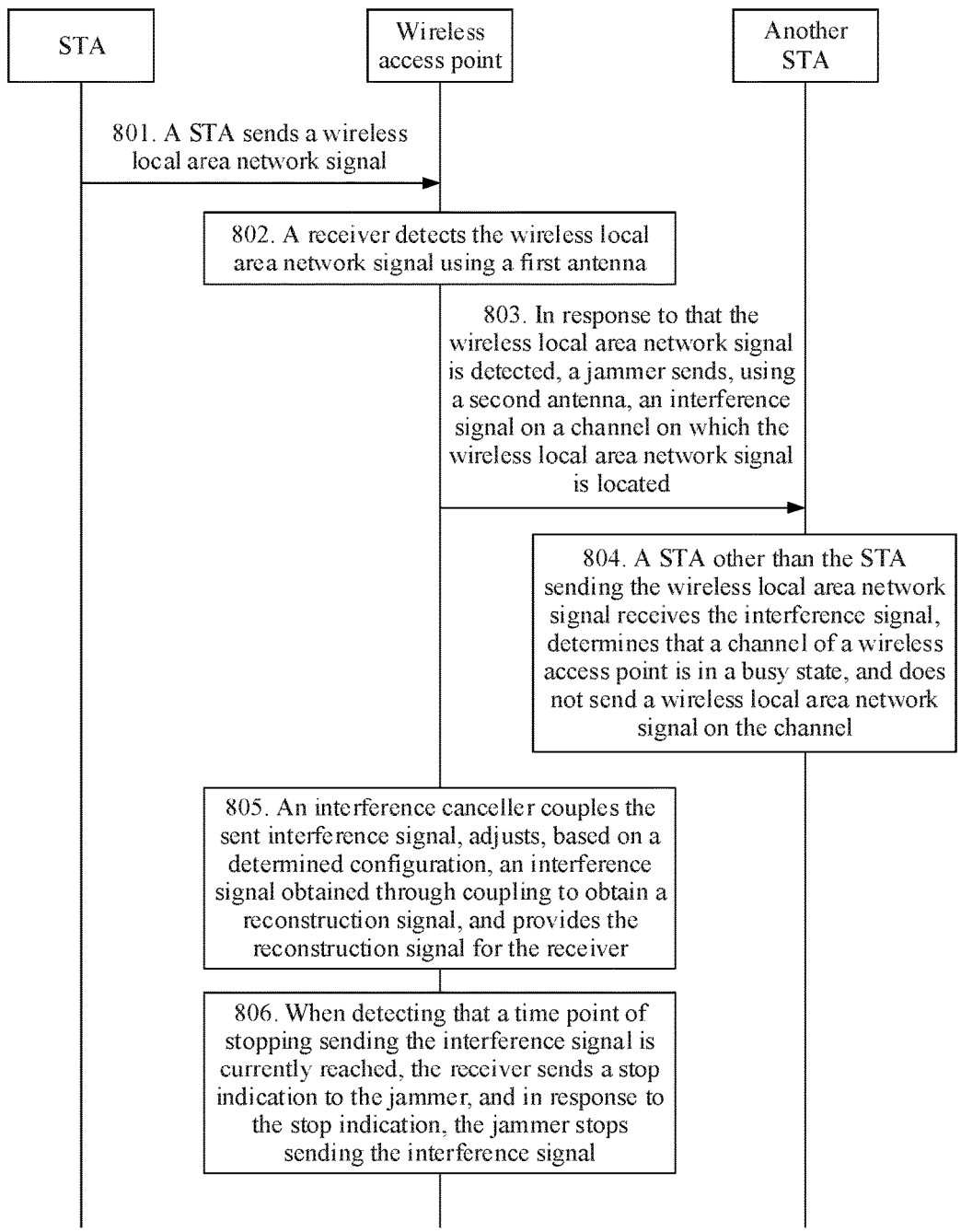
FIG. 8A is a flowchart of a wireless local area network signal receiving method according to an embodiment of this disclosure.

FIG. 8A is a flowchart of a wireless local area network signal receiving method according to an embodiment of this disclosure. In this embodiment of this disclosure, interaction is performed between the wireless access point and the plurality of STAs that are described in the foregoing embodiment. That the wireless access point receives a wireless local area network signal from a STA is used as an example. The wireless access point includes a receiver, a jammer, an interference canceller, a first antenna, and a second antenna. Referring to FIG. 8A, the method includes the following steps.

Step 801. A STA sends a wireless local area network signal.

Step 802. The receiver detects the wireless local area network signal using the first antenna.

A manner for detecting the wireless local area network signal may include, when synchronization detection performed on a synchronization field in a received wireless signal is completed, determining that the wireless local area network signal is detected, checking CRC in a received wireless signal, and when the CRC check succeeds, determining that the wireless local area network signal is detected, or attempting to demodulate a preamble in a received wireless signal, and when demodulating the preamble is completed, determining that the wireless local area network signal is detected.

Step 803. In response to that the wireless local area network signal is detected, the jammer sends, using the second antenna, an interference signal on a channel on which the wireless local area network signal is located.

Step 804. A STA other than the STA sending the wireless local area network signal receives the interference signal, determines that a channel of the wireless access point is in a busy state, and does not send a wireless local area network signal on the channel.

Step 805. The interference canceller couples the sent interference signal, adjusts, based on a determined configuration, an interference signal obtained through coupling to obtain a reconstruction signal, and provides the reconstruction signal for the receiver, where the reconstruction signal is used to cancel the interference signal received by the first antenna.

Step 806. When detecting that a time point of stopping sending the interference signal is currently reached, the receiver sends a stop indication to the jammer, and in response to the stop indication, the jammer stops sending the interference signal.

The time point of stopping sending the interference signal is an end time point of the wireless local area network signal or a time point before the end time point of the wireless local area network signal.

Figure 8B:
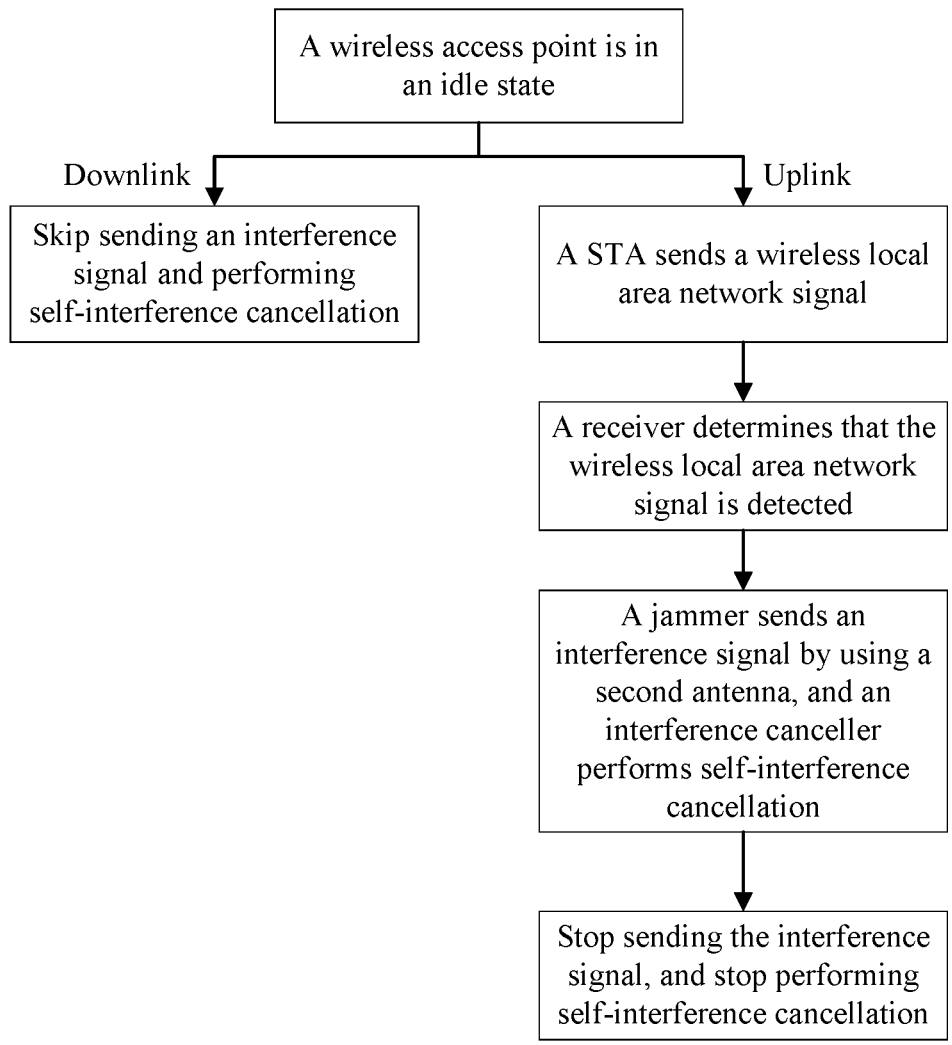
FIG. 8B is a schematic diagram of an operation procedure according to an embodiment of this disclosure.

In this embodiment of the disclosure, that the wireless access point receives a wireless local area network signal from a STA is used as an example. In a process of receiving, by the STA, a wireless local area network signal from the wireless access point, the wireless access point can properly send the wireless local area network signal, with no need to send an interference signal or perform self-interference cancellation on the sent interference signal. Correspondingly, an operation procedure of the wireless access point may be shown in FIG. 8B.

According to the method provided in this embodiment of this disclosure, when a wireless local area network signal from a STA is detected, an interference signal is sent on a channel on which the wireless local area network signal is located. The wireless device generates, based on the interference signal, a reconstruction signal used to cancel the interference signal received by the first antenna, and provides the reconstruction signal at an output end. In this way, the wireless device is not affected by the interference signal sent by the wireless device. The STA sending the wireless local area network signal does not receive the interference signal at the same time, and therefore can properly send the wireless local area network signal. When listening to the interference signal on the channel, a STA other than the STA sending the wireless local area network signal determines that the channel is in a busy state, and keeps silent. This avoids a wireless local area network signal conflict. Sending the interference signal at the time of receiving the wireless local area network signal occupies no additional air interface resource, and a decrease in an overall throughput of a communications system is avoided.

Figure 9A:
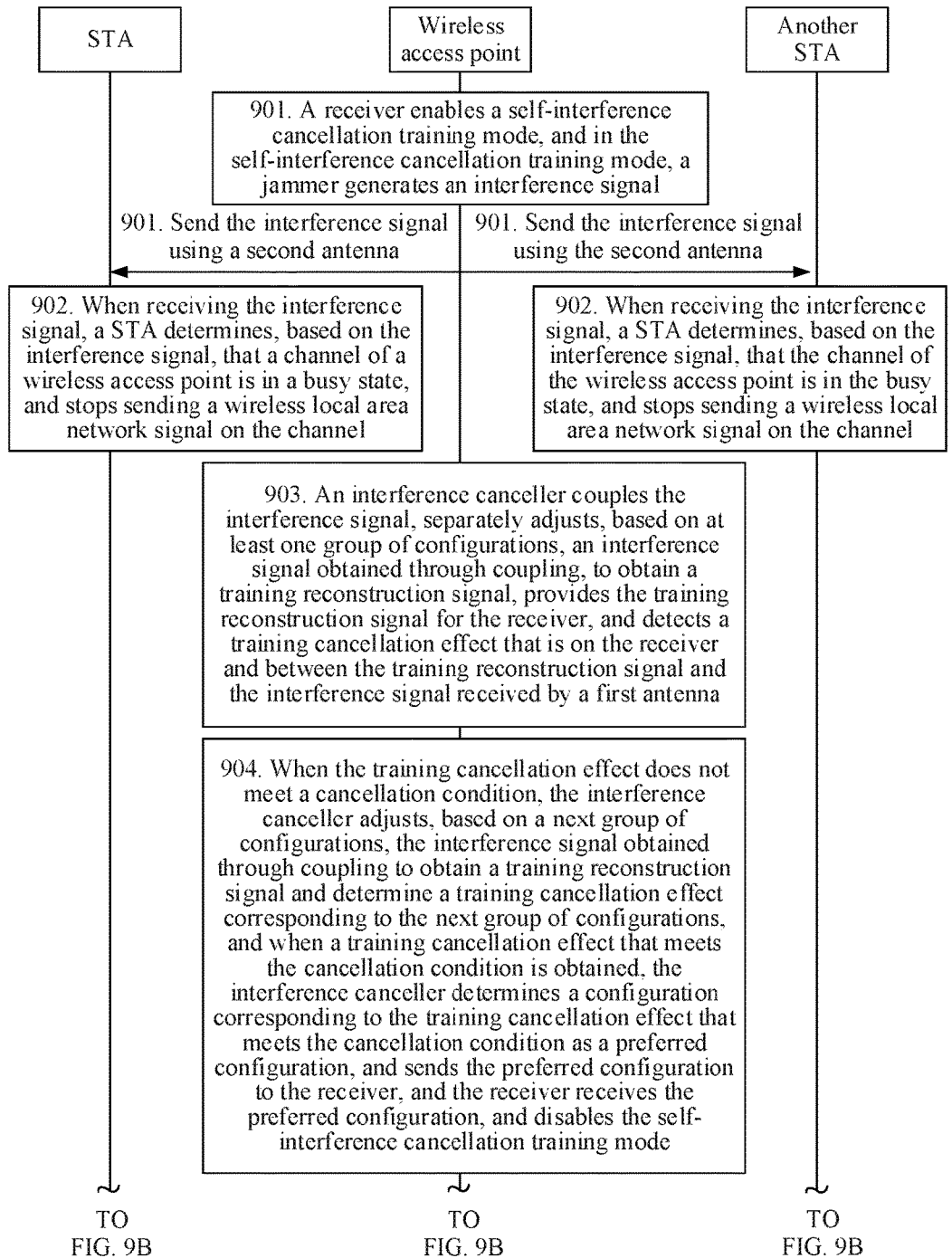
FIG. 9A and FIG. 9B are a flowchart of another wireless local area network signal receiving method according to an embodiment of this disclosure.
Figure 9B:
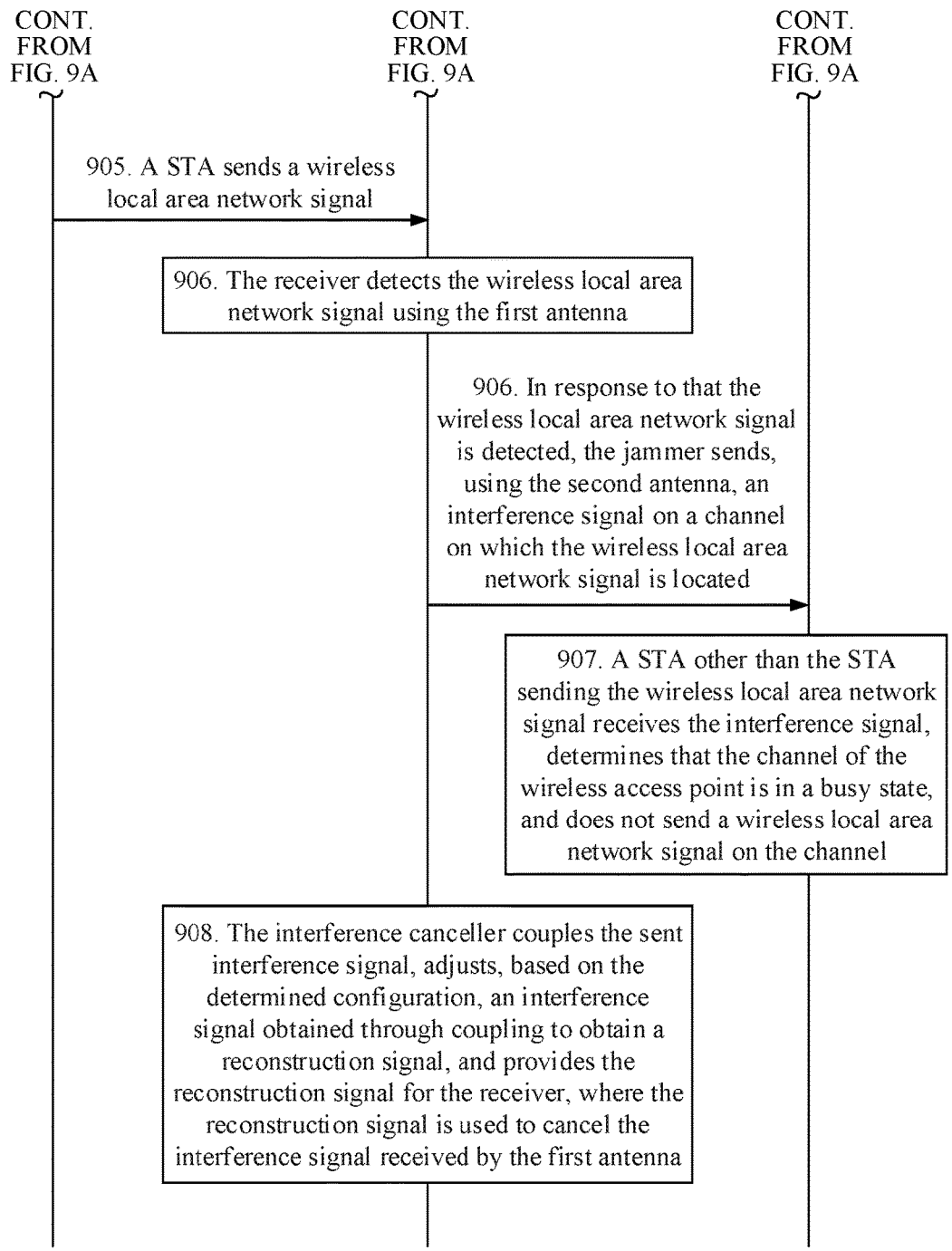

FIGS. 9A and 9B are a flowchart of an interference signal sending method according to an embodiment of this disclosure. In this embodiment of this disclosure, interaction is performed between the wireless access point and the plurality of STAs that are described in the foregoing embodiment. That the wireless access point receives a wireless local area network signal from a STA is used as an example. The wireless access point includes a receiver, a jammer, an interference canceller, a first antenna, and a second antenna. A difference between this embodiment and the foregoing embodiment shown in FIG. 8A lies in that, in this embodiment of this disclosure, the wireless access point first determines a preferred configuration through training, and then performs self-interference cancellation based on the preferred configuration. Referring to FIGS. 9A and 9B, the method includes the following steps.

Step 901. The receiver enables a self-interference cancellation training mode, and in the self-interference cancellation training mode, the jammer generates an interference signal, and sends the interference signal using the second antenna.

Step 901 may be performed by the wireless access point in an idle state at any moment, or periodically performed.

Step 902. When receiving the interference signal, a STA determines, based on the interference signal, that a channel of the wireless access point is in a busy state, and stops sending a wireless local area network signal on the channel.

Step 903. The interference canceller couples the interference signal, separately adjusts, based on at least one group of configurations, an interference signal obtained through coupling, to obtain a training reconstruction signal, provides the training reconstruction signal for the receiver, and detects a training cancellation effect that is on the receiver and between the training reconstruction signal and the interference signal received by the first antenna.

Step 904. When the training cancellation effect does not meet a cancellation condition, the interference canceller adjusts, based on a next group of configurations, the interference signal obtained through coupling to obtain a training reconstruction signal and determine a training cancellation effect corresponding to the next group of configurations, and when a training cancellation effect that meets the cancellation condition is obtained, the interference canceller determines a configuration corresponding to the training cancellation effect that meets the cancellation condition as a preferred configuration, and sends the preferred configuration to the receiver, and the receiver receives the preferred configuration, and disables the self-interference cancellation training mode.

Step 905. A STA sends a wireless local area network signal.

Step 906. The receiver detects the wireless local area network signal using the first antenna, and in response to that the wireless local area network signal is detected, the jammer sends, using the second antenna, an interference signal on a channel on which the wireless local area network signal is located.

Step 907. A STA other than the STA sending the wireless local area network signal receives the interference signal, determines that the channel of the wireless access point is in the busy state, and does not send a wireless local area network signal on the channel.

Step 908. The interference canceller couples the sent interference signal, adjusts, based on the determined configuration, an interference signal obtained through coupling to obtain a reconstruction signal, and provides the reconstruction signal for the receiver, where the reconstruction signal is used to cancel the interference signal received by the first antenna.

Steps 905 to 908 are similar to steps 801 to 806 in the foregoing embodiment shown in FIG. 8A. Details are not described herein again.

Figure 9C:
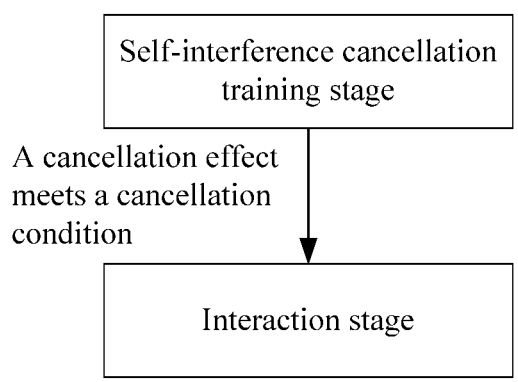
FIG. 9C is a schematic diagram of stages in an operation procedure according to an embodiment of this disclosure.
Figure 9D:
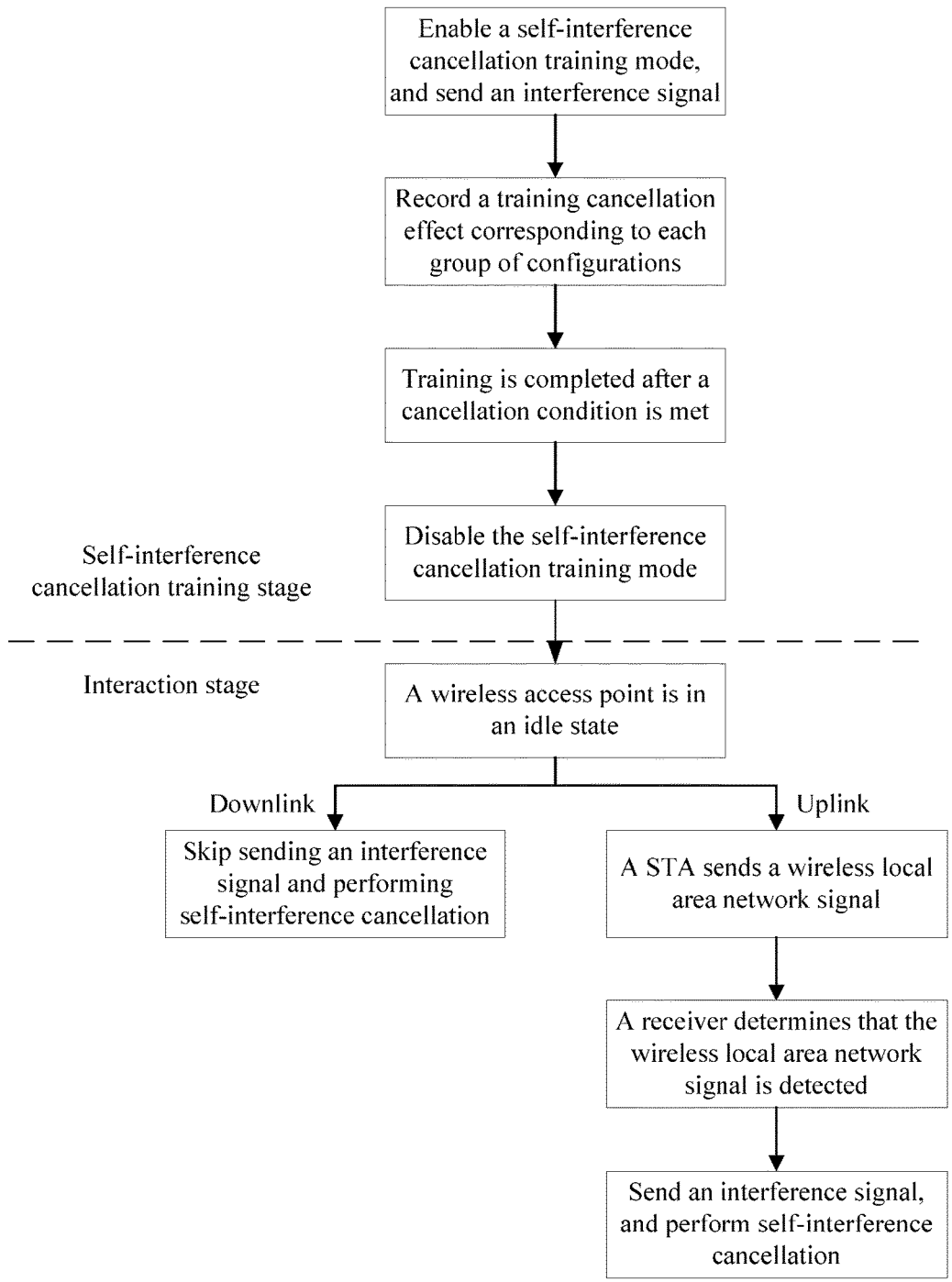
FIG. 9D is a schematic diagram of another operation procedure according to an embodiment of this disclosure.

Correspondingly, as shown in FIG. 9C, an operation procedure of the wireless access point may include two stages, a training stage and an interaction stage. When a cancellation effect meets a cancellation condition, and training is completed, the wireless access point may interact with a STA. For a specific operation procedure, refer to FIG. 9D.

Figure 10A:
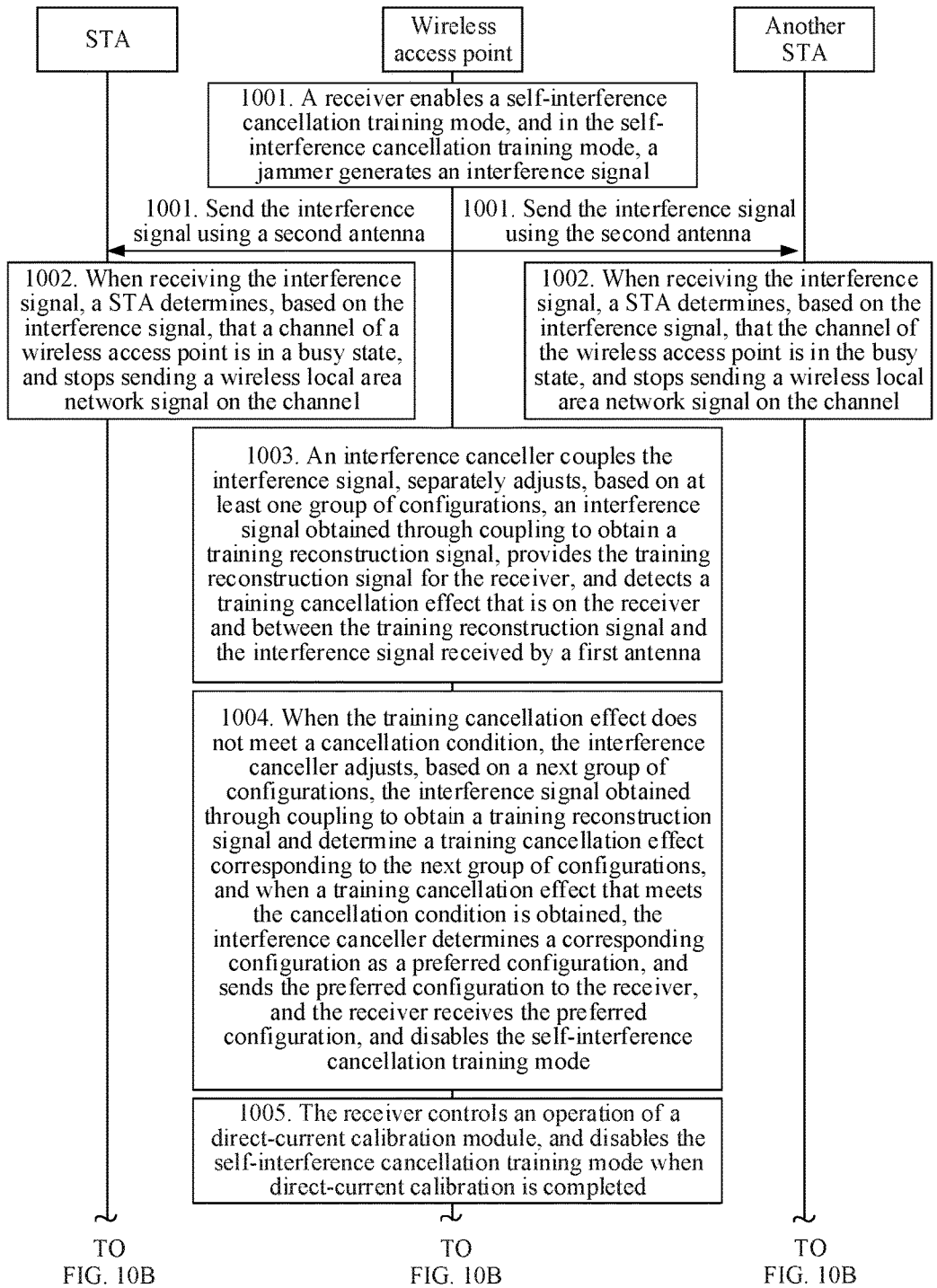
FIG. 10A and FIG. 10B are a flowchart of another wireless local area network signal receiving method according to an embodiment of this disclosure.
Figure 10B:
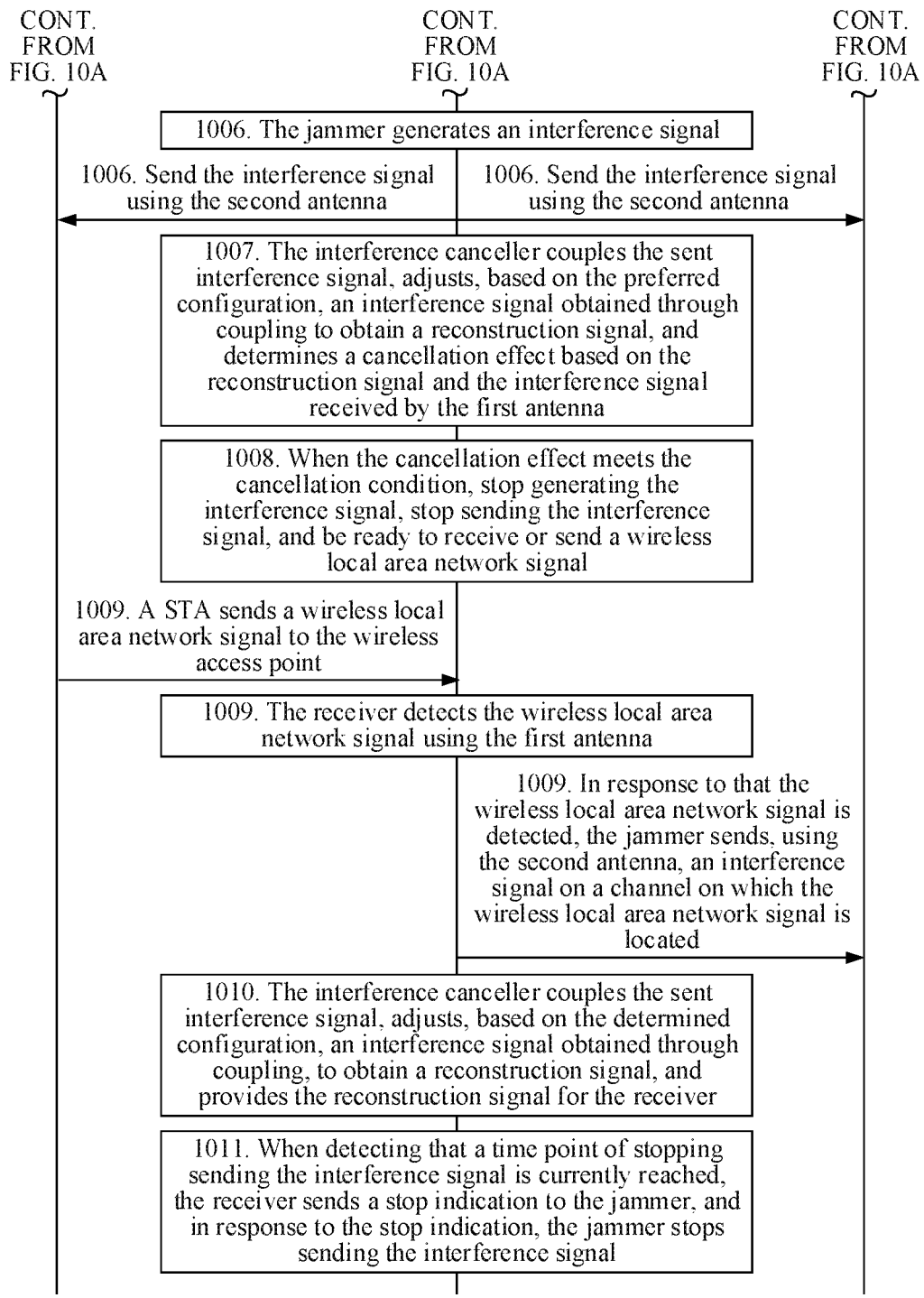

FIGS. 10A and 10B are a flowchart of an interference signal sending method according to an embodiment of this disclosure. In this embodiment of this disclosure, interaction is performed between the wireless access point and the plurality of STAs that are described in the foregoing embodiment. That the wireless access point receives a wireless local area network signal from a STA is used as an example. The wireless access point includes a receiver, a jammer, an interference canceller, a first antenna, and a second antenna. A difference between this embodiment and the foregoing embodiments shown in FIG. 8A and FIGS. 9A and 9B lies in that, in this embodiment of this disclosure, at any moment after training and before interaction, the wireless access point may send an interference signal in an analog manner to determine whether a current cancellation effect meets a cancellation condition in order to determine, based on a determining result, whether to perform retraining. Referring to FIGS. 10A and 10B, the method includes the following steps.

Step 1001. The receiver enables a self-interference cancellation training mode, and in the self-interference cancellation training mode, the jammer generates an interference signal, and sends the interference signal using the second antenna.

The interference signal is a monophonic signal.

In a possible implementation, after enabling the self-interference cancellation training mode, the wireless access point sends a CTS-to-self. The CTS-to-self is used to instruct a STA associated with the wireless access point to stop sending a wireless local area network signal in a reserved time period. This is equivalent to that the wireless access point sends a CTS to a local end. In this case, the STA cannot send a wireless local area network signal in the reserved time period. In the reserved time period, the wireless access point receives no wireless local area network signal, but receives only the interference signal that is sent using a transmit antenna and that is then transmitted to a receive antenna. In this way, interference in the wireless local area network signal can be excluded, and training is performed based on only a reconstruction signal and the interference signal transmitted to and received by the first antenna, thereby improving accuracy of a training procedure, and improving a cancellation effect.

Step 1002. When receiving the interference signal, a STA determines, based on the interference signal, that a channel of the wireless access point is in a busy state, and stops sending a wireless local area network signal on the channel.

Step 1003. The interference canceller couples the interference signal, separately adjusts, based on at least one group of configurations, an interference signal obtained through coupling to obtain a training reconstruction signal, provides the training reconstruction signal for the receiver, and detects a training cancellation effect that is on the receiver and between the training reconstruction signal and the interference signal received by the first antenna.

Step 1004. When the training cancellation effect does not meet a cancellation condition, the interference canceller adjusts, based on a next group of configurations, the interference signal obtained through coupling to obtain a training reconstruction signal and determine a training cancellation effect corresponding to the next group of configurations, and when a training cancellation effect that meets the cancellation condition is obtained, the interference canceller determines a configuration corresponding to the training cancellation effect that meets the cancellation condition as a preferred configuration, and sends the preferred configuration to the receiver, and the receiver receives the preferred configuration, and disables the self-interference cancellation training mode.

Step 1005. The receiver controls an operation of a direct-current calibration module, and disables the self-interference cancellation training mode when direct-current calibration is completed.

Step 1006. The jammer generates an interference signal and sends the interference signal using the second antenna.

Step 1007. The interference canceller couples the sent interference signal, adjusts, based on the preferred configuration, an interference signal obtained through coupling to obtain a reconstruction signal, and determines a cancellation effect based on the reconstruction signal and the interference signal received by the first antenna.

Step 1008. When the cancellation effect meets the cancellation condition, stop generating the interference signal, stop sending the interference signal, and be ready to receive or send a wireless local area network signal.

To prevent impact of an external environment change and detect a self-interference cancellation capability unexpectedly, a self-interference cancellation function may be detected before the wireless local area network signal is received. In steps 1006 to 1008, the cancellation effect is monitored after self-interference cancellation is completed, to determine whether the cancellation effect meets the cancellation condition. When the cancellation effect meets the cancellation condition, detection may be stopped. In another embodiment, when the cancellation effect does not meet the cancellation condition, the self-interference cancellation training mode is enabled, and retraining is performed, to determine a preferred configuration that meets the cancellation condition. A training procedure is similar to steps 1001 to 1004. Details are not described herein again.

When being ready to perform sending or receiving, the receiver in the wireless access point disables the jammer and the interference canceller, and restores a calibration parameter of the direct-current calibration module to a configuration used when interference of the interference signal does not exist such that in a subsequent interaction process, direct-current calibration may continue to be performed based on a configured calibration parameter.

Step 1009. A STA sends a wireless local area network signal, the receiver detects the wireless local area network signal using the first antenna, and in response to that the wireless local area network signal is detected, the jammer sends, using the second antenna, an interference signal on a channel on which the wireless local area network signal is located.

Step 1010. The interference canceller couples the sent interference signal, adjusts, based on the determined configuration, an interference signal obtained through coupling, to obtain a reconstruction signal, and provides the reconstruction signal for the receiver, where the reconstruction signal is used to cancel the interference signal received by the first antenna.

Step 1011. When detecting that a time point of stopping sending the interference signal is currently reached, the receiver sends a stop indication to the jammer, and in response to the stop indication, the jammer stops sending the interference signal.

Figure 10C:
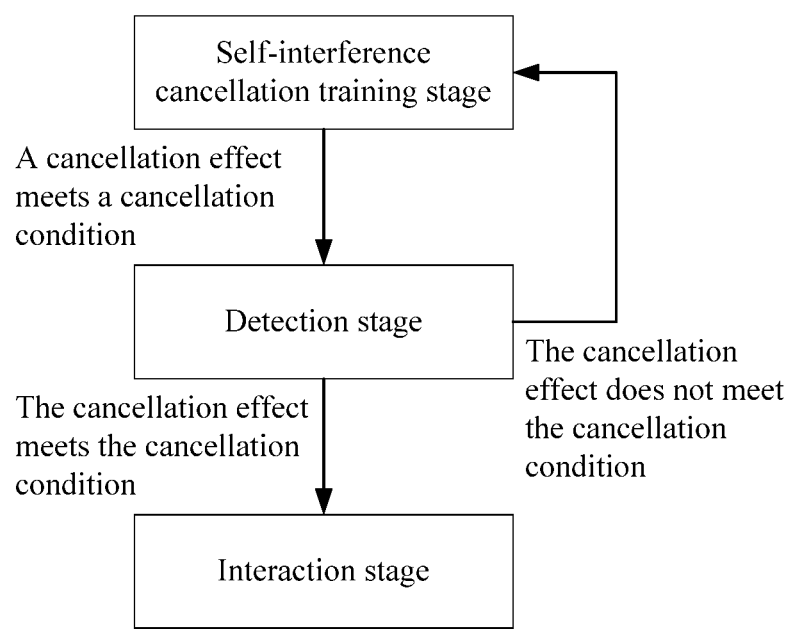
FIG. 10C is a schematic diagram of stages in an operation procedure according to an embodiment of this disclosure.
Figure 10D:
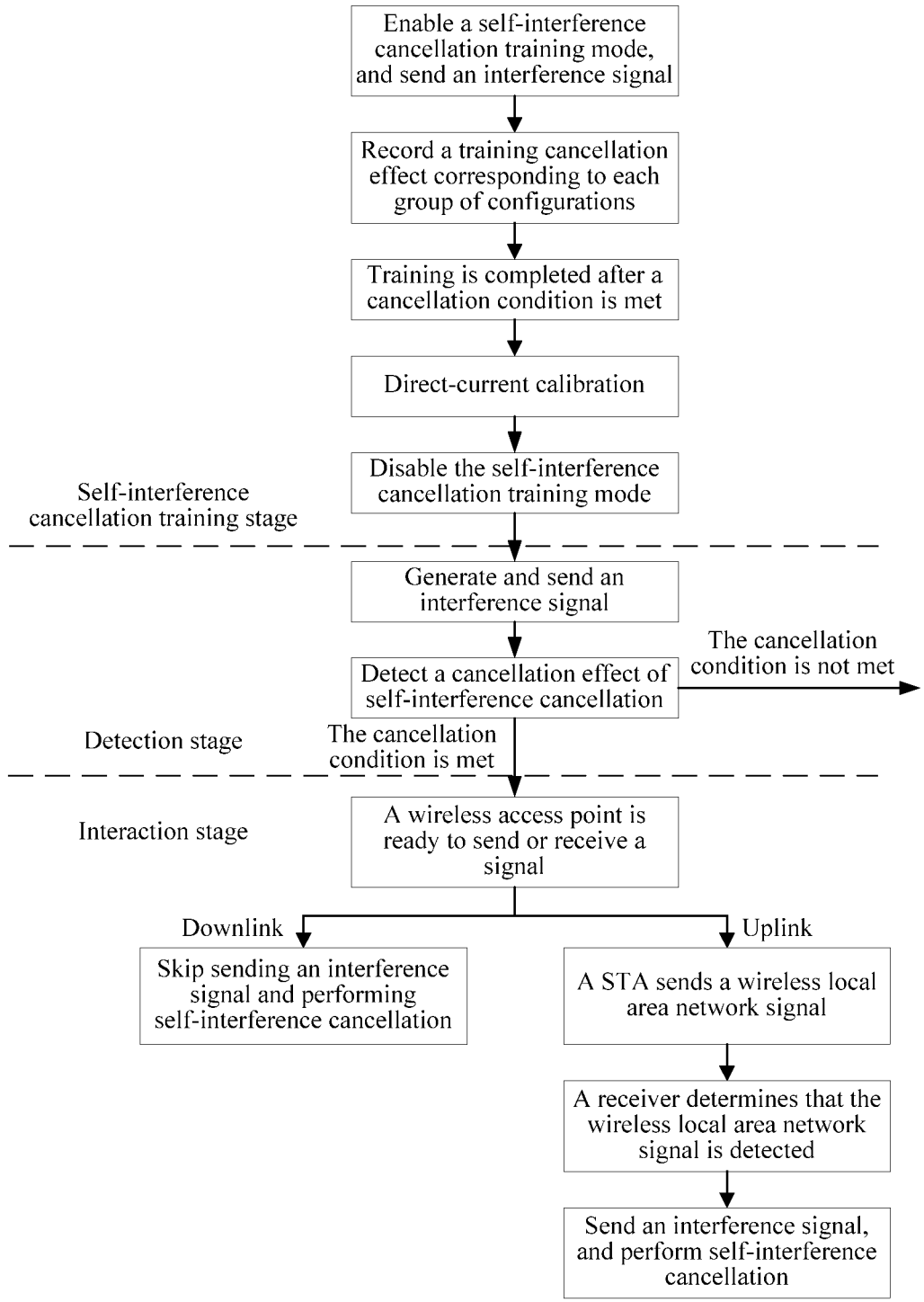
FIG. 10D is a schematic diagram of another operation procedure according to an embodiment of this disclosure.

Correspondingly, as shown in FIG. 10C, an operation procedure of the wireless access point may include three stages, a training stage, a detection stage, and an interaction stage. When a cancellation effect meets a cancellation condition, at any moment after training is completed, a cancellation effect of self-interference cancellation may be detected, to prevent impact of an external environment change. When it is detected that the cancellation effect does not meet the cancellation condition, retraining may be performed, or when the cancellation effect meets the cancellation condition, the interaction stage may be entered. For a specific operation procedure, refer to FIG. 10D.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

What is claimed is:

1. A wireless device, comprising:
   a first antenna;
   a second antenna;
   an interference cancelling circuit, wherein an input end of the interference cancelling circuit is coupled to the second antenna, and wherein an output end of the interference cancelling circuit is coupled to the first antenna;
   a receiver coupled to the first antenna and configured to detect a wireless local area network signal; and
   a jammer coupled to the second antenna and configured to send, in response to the receiver detecting the wireless local area network signal and using the second antenna, an interference signal on a channel on which the wireless local area network signal is located,
   wherein the interference cancelling circuit is configured to:
     generate, based on the interference signal from the input end, a reconstruction signal cancelling the interference signal; and
     provide the reconstruction signal at the output end,
   wherein the receiver is further configured to send a stop indication to the jammer when detecting that a time point to stop sending the interference signal is reached, and
   wherein the jammer is further configured to stop sending the interference signal in response to the stop indication.

2. The wireless device of claim 1, wherein the receiver is further configured to determine that the wireless local area network signal is detected when synchronization detection performed on a synchronization field in a received wireless signal is completed.

3. The wireless device of claim 1, wherein the interference cancelling circuit comprises:
   a phase shifter configured to adjust a phase of the interference signal; and
   an attenuator configured to attenuate the interference signal.

4. The wireless device of claim 1, wherein the wireless local area network signal comprises a field indicating an end time of the wireless local area network signal, wherein the receiver is further configured to send an end indication indicating the end time of the wireless local area network signal to the jammer, and wherein the jammer is further configured to stop sending the interference signal according to the end indication when the wireless local area network signal is ended or before the wireless local area network signal is ended.

5. The wireless device of claim 1, wherein the receiver is further configured to enable a self-interference cancellation training mode, and wherein in response to the receiver enabling the self-interference cancellation training mode, the jammer is further configured to:
   generate the interference signal; and
   send the interference signal using the second antenna,
   wherein the interference cancelling circuit is further configured to:
     couple the interference signal from the input end;
     separately adjust, based on at least one group of configurations, a second interference signal obtained through coupling to obtain a training reconstruction signal;
     provide the training reconstruction signal at the output end;
     detect a training cancellation effect at the output end between the training reconstruction signal and the interference signal received by the first antenna;
     determine a configuration corresponding to the training cancellation effect meeting a cancellation condition as a preferred configuration when the training cancellation effect meeting the cancellation condition is obtained; and
     send the preferred configuration to the receiver, and
   wherein the receiver is further configured to:
     receive the preferred configuration; and
     disable the self-interference cancellation training mode.

6. The wireless device of claim 5, wherein the receiver is further configured to start the jammer and the interference cancelling circuit after the self-interference cancellation training mode is disabled, and wherein the jammer is further configured to:
   generate the interference signal; and
   send the interference signal using the second antenna,
   wherein the interference cancelling circuit is further configured to:
     couple the interference signal from the input end;
     adjust, based on the preferred configuration, the interference signal obtained through coupling to obtain the reconstruction signal;
     provide the reconstruction signal at the output end;
     detect the training cancellation effect at the output end between the reconstruction signal and the interference signal received by the first antenna;
     send a disabling notification message to the receiver when the training cancellation effect meets the cancellation condition, wherein the disabling notification message provides an instruction to disable the jammer and the interference cancelling circuit; and send a training notification message to the receiver when the training cancellation effect does not meet the cancellation condition, wherein the training notification message provides an instruction to enable the self-interference cancellation training mode, and wherein the receiver is further configured to:
disable the jammer and the interference cancelling circuit when the disabling notification message is received; and
enable the self-interference cancellation training mode when the training notification message is received.

7. The wireless device of claim 5, wherein the receiver is further configured to send a clear to send-to-self (CTS-to-self) frame when the self-interference cancellation training mode is enabled, and wherein the CTS-to-self frame instructs a station (STA) associated with the wireless device to stop sending any wireless local area network signal in a reserved time period.

8. The wireless device of claim 1, wherein the receiver is further configured to:
check a cyclic redundancy check (CRC) code in a received wireless signal; and
determine that the wireless local area network signal is detected when the CRC code check succeeds.

9. The wireless device of claim 1, wherein the receiver is further configured to:
attempt to demodulate a preamble in a received wireless signal; and
determine that the wireless local area network signal is detected when demodulating the preamble is completed.

10. A wireless local area network signal receiving method, comprising:
detecting, by a receiver, a wireless local area network signal using a first antenna;
sending, using a second antenna in response to detecting the wireless local area network signal, an interference signal on a channel on which the wireless local area network signal is located;
generating, by an interference cancelling circuit based on the interference signal, a reconstruction signal cancelling the interference signal received by the first antenna;
providing, by the interference cancelling circuit, the reconstruction signal for the receiver;
sending, by the receiver, a stop indication to a jammer when detecting that a time point to stop sending the interference signal is currently reached; and
stop sending, by the jammer, the interference signal in response to the stop indication.

11. The wireless local area network signal receiving method of claim 10, wherein detecting the wireless local area network signal comprises determining that the wireless local area network signal is detected when synchronization detection performed on a synchronization field in a received wireless signal is completed.

12. The wireless local area network signal receiving method of claim 10, wherein the interference cancelling circuit comprises a phase shifting circuit and an attenuating circuit, and wherein generating the reconstruction signal cancelling the interference signal received by the first antenna comprises:
adjusting, by the phase shifting circuit, a phase of the interference signal; and
attenuating, by the attenuating circuit, the interference signal.

13. The wireless local area network signal receiving method of claim 10, wherein the wireless local area network signal comprises a field indicating an end time of the wireless local area network signal, and wherein the wireless local area network signal receiving method further comprises:
sending, by the receiver, an end indication indicating the end time of the wireless local area network signal to the jammer; and
stop sending, by the jammer, the interference signal according to the end indication when the wireless local area network signal is ended or before the wireless local area network signal is ended.

14. The wireless local area network signal receiving method of claim 10, further comprising:
enabling, by the receiver, a self-interference cancellation training mode;
generating, by the jammer, the interference signal in the self-interference cancellation training mode;
sending, by the jammer, the interference signal using the second antenna in the self-interference cancellation training mode;
coupling, by the interference cancelling circuit, the interference signal;
separately adjusting, by the interference cancelling circuit based on at least one group of configurations, a second interference signal obtained through coupling to obtain a training reconstruction signal;
providing, by the interference cancelling circuit, the training reconstruction signal for the receiver;
detecting, by the interference cancelling circuit, a training cancellation effect on the receiver between the training reconstruction signal and the interference signal received by the first antenna;
determining, by the interference cancelling circuit, a configuration corresponding to the training cancellation effect meeting a cancellation condition as a preferred configuration when the training cancellation effect meeting the cancellation condition is obtained;
sending, by the interference cancelling circuit, the preferred configuration to the receiver;
receiving, by the receiver, the preferred configuration; and
disabling, by the receiver, the self-interference cancellation training mode.

15. The wireless local area network signal receiving method of claim 14, wherein after disabling the self-interference cancellation training mode, the wireless local area network signal receiving method further comprises:
starting, by the receiver, the jammer and the interference cancelling circuit;
generating, by the jammer, the interference signal;
sending, by the jammer, the interference signal using the second antenna;
coupling, by the interference cancelling circuit, the interference signal;
adjusting, by the interference cancelling circuit based on the preferred configuration, the interference signal obtained through coupling to obtain the reconstruction signal;
providing, by the interference cancelling circuit, the reconstruction signal for the receiver;
detecting, by the interference cancelling circuit, the training cancellation effect on the receiver between the reconstruction signal and the interference signal received by the first antenna;

sending, by the interference cancelling circuit, a disabling notification message to the receiver when the training cancellation effect meets the cancellation condition, wherein the disabling notification message provides an instruction to disable the jammer and the interference cancelling circuit;

sending, by the interference cancelling circuit, a training notification message to the receiver when the training cancellation effect does not meet the cancellation condition, wherein the training notification message provides an instruction to enable the self-interference cancellation training mode;

closing, by the receiver, the jammer and the interference cancelling circuit when the disabling notification message is received; and enabling the self-interference cancellation training mode when the training notification message is received.

16. The wireless local area network signal receiving method of claim 14, wherein during enabling the self-interference cancellation training mode, the wireless local area network signal receiving method further comprises sending, by the receiver, a clear to send-to-self (CTS-to-self) frame, and wherein the CTS-to-self frame instructs a station (STA) associated with a wireless device to stop sending any wireless local area network signal in a reserved time period.

17. The wireless local area network signal receiving method of claim 10, wherein detecting the wireless local area network signal comprises:

checking a cyclic redundancy check (CRC) code in a received wireless signal; and determining that the wireless local area network signal is detected when the CRC code check succeeds.

18. The wireless local area network signal receiving method of claim 10, wherein detecting the wireless local area network signal comprises:

attempting to demodulate a preamble in a received wireless signal; and determining that the wireless local area network signal is detected when demodulating the preamble is completed.

19. A wireless device, comprising:

a first antenna;

a second antenna;

an interference cancelling circuit having an input end and an output end, wherein the input end is coupled to the second antenna, and wherein the output end is coupled to the first antenna;

a receiver coupled to the first antenna and configured to detect a wireless local area network signal; and a jammer coupled to the second antenna and configured to send, in response to the receiver detecting the wireless local area network signal and using the second antenna, an interference signal on a channel on which the wireless local area network signal is located, wherein the interference cancelling circuit is configured to:

generate, based on the interference signal from the input end, a reconstruction signal cancelling the interference signal; and provide the reconstruction signal at the output end, wherein the wireless local area network signal comprises a field indicating an end time of the wireless local area network signal, wherein the receiver is further configured to send an end indication indicating the end time of the wireless local area network signal to the jammer, and wherein the jammer is further configured to stop sending the interference signal according to the end indication when the wireless local area network signal is ended or before the wireless local area network signal is ended.

20. The wireless device of claim 19, wherein the interference cancelling circuit comprises:

a phase shifter configured to adjust a phase of the interference signal; and an attenuator configured to attenuate the interference signal.

* * * * *